United States Patent
Cuk

(10) Patent No.: US 8,350,540 B2
(45) Date of Patent: Jan. 8, 2013

(54) STORAGELESS STEP-DOWN SWITCHING DC-DC CONVERTER

(75) Inventor: Slobodan Cuk, Laguna Niguel, CA (US)

(73) Assignee: Cuks, LLC, Irvine, CA (US)

( * ) Notice: Subject to any disclaimer, the term of this patent is extended or adjusted under 35 U.S.C. 154(b) by 33 days.

(21) Appl. No.: 12/807,664

(22) Filed: Sep. 9, 2010

(65) Prior Publication Data

US 2011/0057640 A1    Mar. 10, 2011

Related U.S. Application Data

(60) Provisional application No. 61/276,642, filed on Sep. 10, 2009.

(51) Int. Cl.
*G05F 1/595* (2006.01)
*G05F 1/62* (2006.01)

(52) U.S. Cl. ........ 323/232; 323/224; 323/225; 323/229; 323/271

(58) Field of Classification Search .................. 323/223, 323/224, 229, 232, 233, 271, 282, 284, 225; 363/21.02, 21.03
See application file for complete search history.

(56) References Cited

U.S. PATENT DOCUMENTS

| | | | |
|---|---|---|---|
| 4,184,197 A | 1/1980 | Cuk | |
| 4,257,087 A | 3/1981 | Cuk | |
| 5,164,656 A * | 11/1992 | Gulczynski | 323/222 |
| 6,486,642 B1 * | 11/2002 | Qian | 323/259 |
| 6,989,997 B2 * | 1/2006 | Xu et al. | 363/16 |
| 7,548,435 B2 * | 6/2009 | Mao | 363/16 |
| 7,746,041 B2 * | 6/2010 | Xu et al. | 323/223 |

* cited by examiner

*Primary Examiner* — Gary L Laxton

(57) ABSTRACT

A storageless DC-DC converter is provided having simultaneously ultra high efficiency of 99.5% in an ultra compact size leading to 1 kW/inch$^3$ power density, while also providing a regulation over the wide input DC voltage range. In addition to fixed 2 to 1 step-down voltage conversion the continuous output voltage reduction is obtained by use of a new method of the modulation of the freewheeling time of one of the two current rectifiers. This provides a simple regulation of the output voltage via a standard duty ratio control, despite the wide range of the input voltage change and simultaneous wide range of the load current change. An alternative control method customarily used in classical resonant converters to control output voltage by change of the switching frequency with a fixed duty ratio control is also demonstrated. Because of its storageless feature and continuous output voltage regulation this converter is ideal for computer applications, such as VRM (Voltage Regulator Modules), demanding extremely fast transient response to fast load current changes and tight load voltage regulations requiring ultra low output ripple voltages.

20 Claims, 37 Drawing Sheets

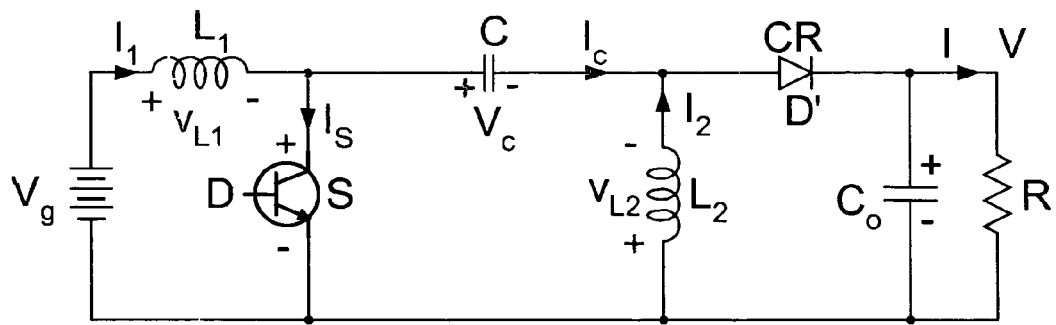
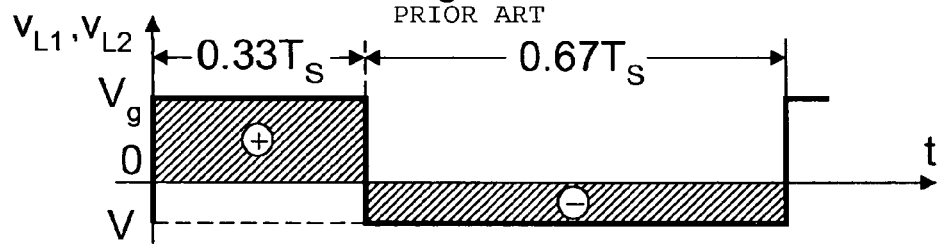
Fig. 6a
PRIOR ART
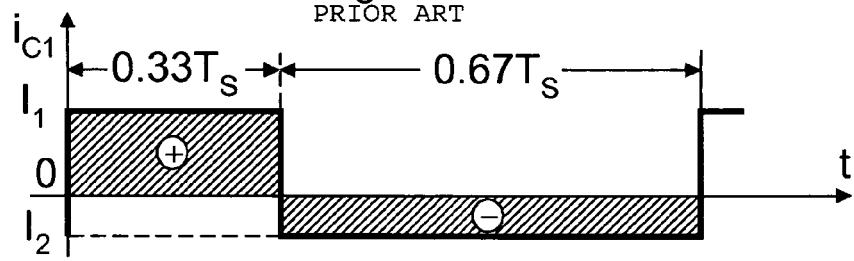
Fig. 6b
PRIOR ART
Fig. 6c
PRIOR ART
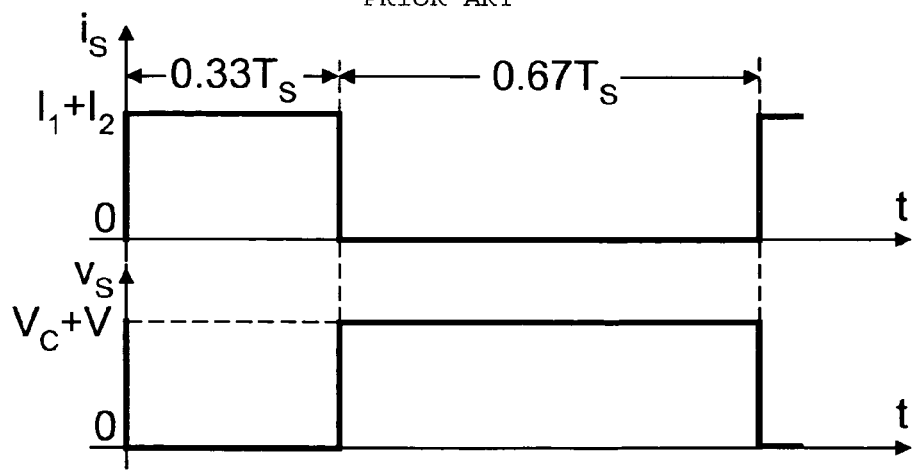
Fig. 6d
PRIOR ART

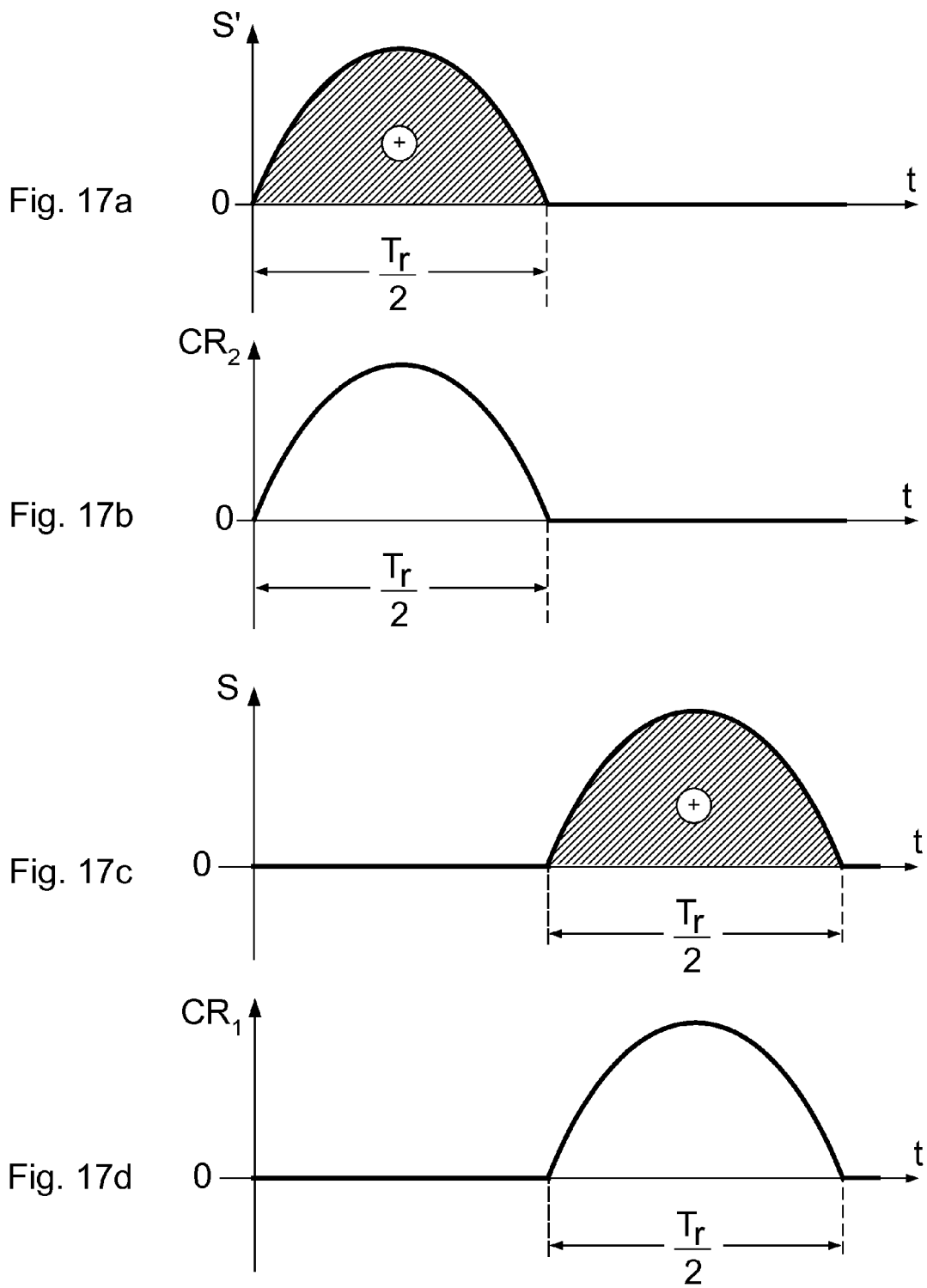

STORAGELESS STEP-DOWN SWITCHING DC-DC CONVERTER

CROSS-REFERENCE TO RELATED APPLICATIONS

Provisional U.S. Patent Application No. 61/276,642
Filed on Sep. 10, 2009

FIELD OF INVENTION

The general field of invention is switching DC-DC converters with step-down DC voltage characteristic. More specifically it also belongs to the class of non-isolated DC-DC converters. The present DC-DC converters all store the DC energy in the magnetic devices, inductors and/or transformers. The present invention opens up a new category of DC-DC converters which do not store DC energy in magnetics and therefore result in important performance advantages, such as ultra high efficiency, extremely compact size and ultra low weight.

DEFINITIONS AND CLASSIFICATIONS

The following notation is consistently used throughout this text in order to facilitate easier delineation between various quantities:

1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta V$—The AC ripple voltage on resonant capacitor $C_r$;
6. $f_S$—Switching frequency of converter;
7. $T_S$—Switching period of converter inversely proportional to switching frequency $f_S$;
8. $T_{ON}$—ON-time interval $T_{ON}=DT_S$ during which switch S is turned-ON;
9. $T_{OFF}$—OFF-time interval $T_{OFF}=D'T_S$ during which switch S is turned-OFF;
10. D—Duty ratio of the main controlling switch S;
11. S'—switch which operates in complementary way to switch S: when S is closed S' is open and opposite, when S is open S' is closed;
12. D'—Complementary duty ratio $D'=1-D$ of the switch S' complementary to main controlling switch S;
13. $f_r$—Resonant switching frequency defined by resonant inductor $L_r$ and resonant capacitor $C_r$;
14. $T_r$—Resonant period defined as $T_r=1/f_r$;
15. $t_r$—One half of resonant period $T_r$;
16. S—Controllable switch with two switch states: ON and OFF;
17. CR—Two-terminal Current Rectifier whose ON and OFF states depend on controlling S switch states.

BRIEF DESCRIPTION OF THE DRAWINGS

FIG. 1b illustrates the state of the switches for the buck converter of FIG. 1a.

FIG. 3a illustrates inductor current of the buck converter in FIG. 1a, and FIG. 3b illustrates inductor current transient from 25% load to 100% load current for the buck converter of FIG. 1a.

FIG. 6a is a SEPIC DC-DC voltage converter and FIG. 6b illustrates voltage waveforms of SEPIC converter, FIG. 6c illustrate the current waveform of capacitor C in SEPIC converter, and FIG. 6d illustrates the switch voltage and current waveforms of SEPIC converter.

FIG. 8a illustrates one embodiment of the present invention of a storageless DC-DC converter and FIG. 8b is a diagram of the state of the switches in the converter of FIG. 8a.

FIG. 11b is the two-quadrant operation of the VBS switch of FIG. 11a.

FIG. 12a is one resonant circuit model for the converter of FIG. 8a and FIG. 12b illustrates the other resonant circuit model for the converter of FIG. 8a.

FIG. 13a illustrates resonant capacitor $C_r$ current, while

FIG. 14a illustrates volt-second requirements for the inductor of the buck converter of FIG. 1a, and FIG. 14b illustrates the volt-second requirements for the resonant inductors of the converter in FIG. 8a.

FIG. 15a illustrates instantaneous and DC input current of a converter of FIG. 8a and FIG. 15b illustrates the instantaneous and DC load current for converter of FIG. 8a.

FIG. 17a, FIG. 17b, FIG. 17c, and FIG. 17d illustrate the currents of the four switches of a converter in FIG. 8a.

FIG. 35a and FIG. 35b illustrate respectively the input and output currents of the converter in FIG. 33a.

PRIOR ART

Prior-Art Buck Converter

Figure 1A:
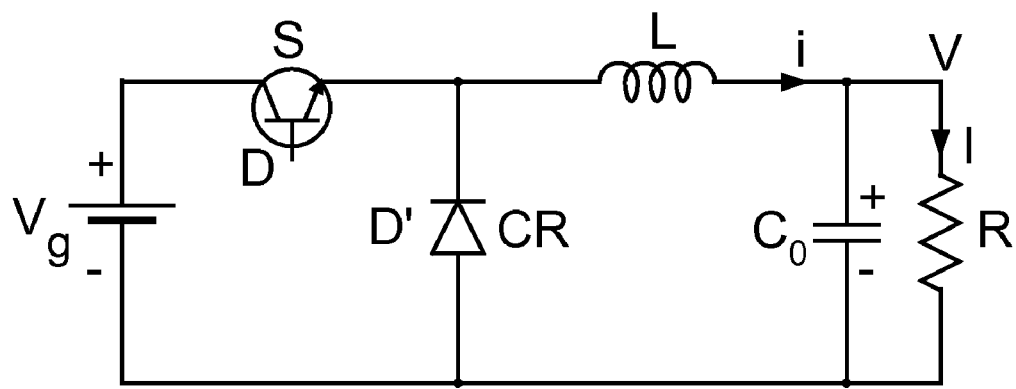
FIG. 1a illustrates a prior-art buck converter.
Figure 1B:
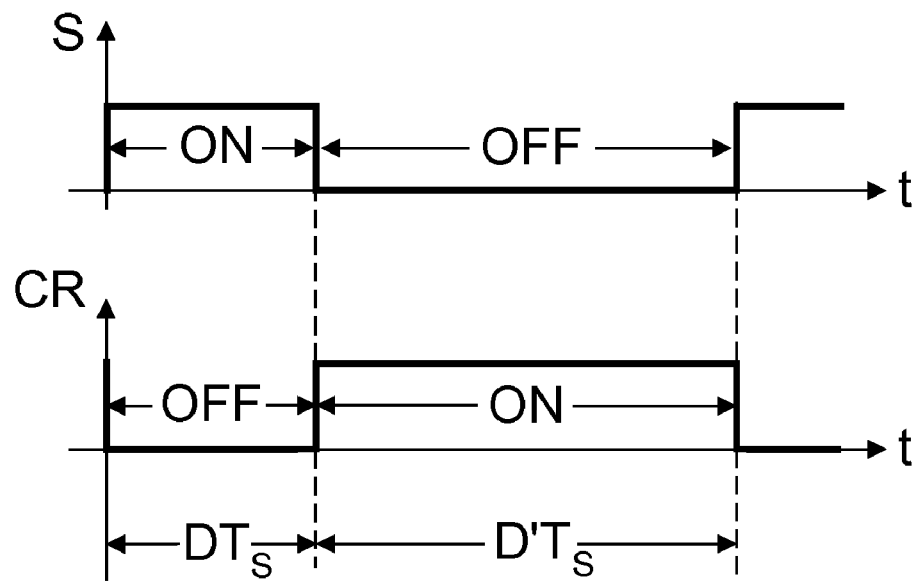

The non-isolated prior-art Pulse Width Modulated (PWM) buck switching converter shown in FIG. 1a consists of two complementary switches: when S is ON, CR is OFF and vice versa (in continuous conduction mode) as shown by the switch states in FIG. 1b. It is capable of step-down only of the input DC voltage dependent of operating duty ratio D, which is the ratio of the ON time of switch S and switching period $T_S$.

Figure 2A:
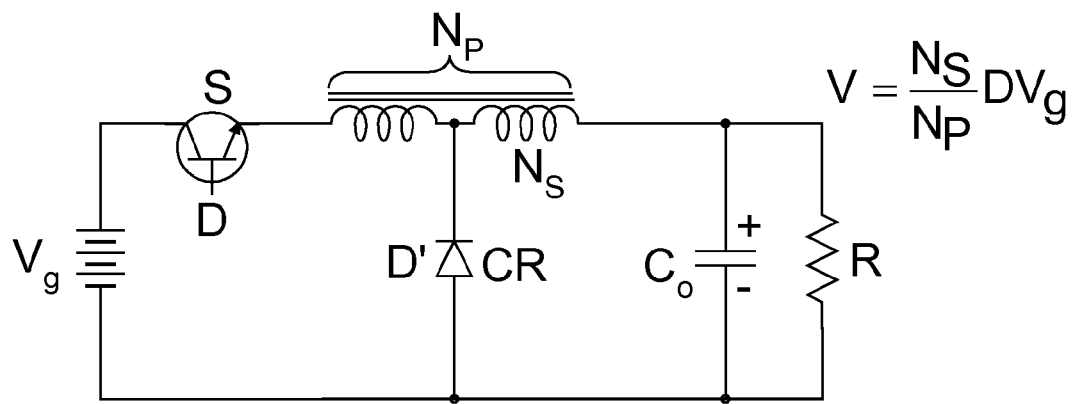
FIG. 2a is a prior-art tapped inductor buck converter.
Figure 2B:
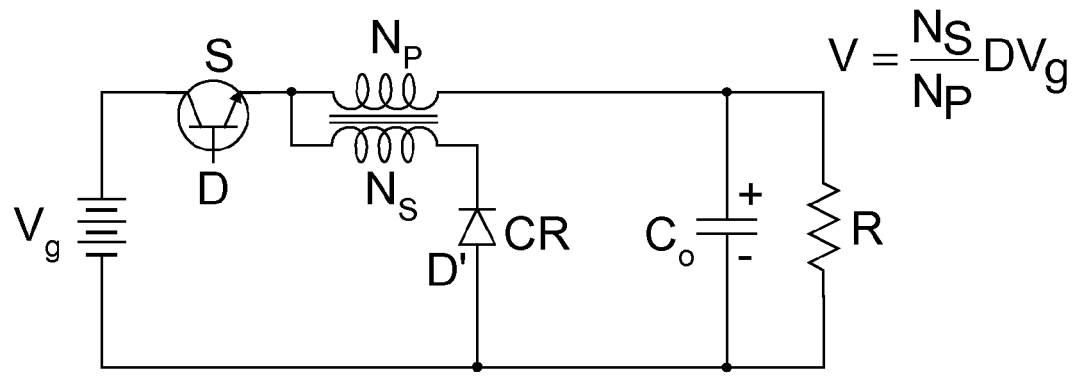
FIG. 2b is another the prior-art tapped inductor buck converter.

However, if an additional step-down conversion ratio is needed, the prior-art tapped inductor version of FIG. 2a is obtained. For example, when a tap is in a center of the inductor an additional 2:1 step down is accomplished. Another prior-art tapped inductor is shown in FIG. 2b in which the tapped inductor provides actual fixed step-up conversion ratio depending on the turn's ratio of the two windings.

Figure 3A:
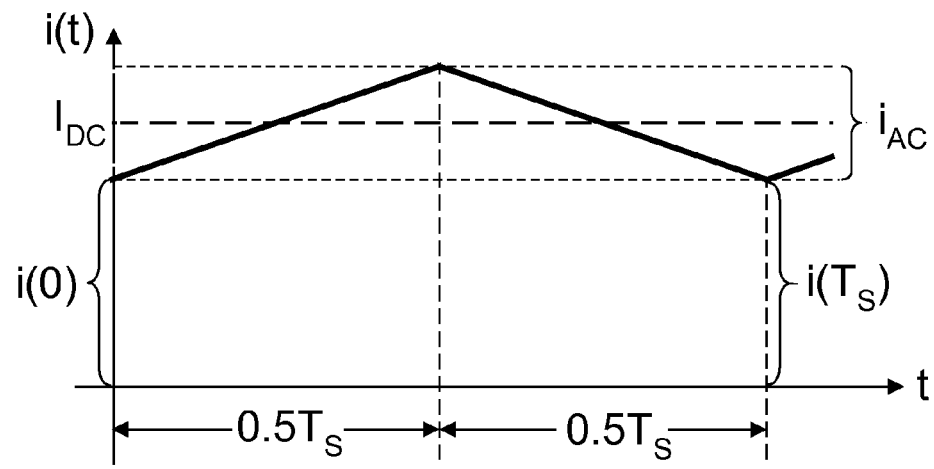

The inductor L in the buck converter of FIG. 1a, must conduct a full DC load current so that its instantaneous inductor current waveform i(t) shown on FIG. 3a must have a DC-bias equal to DC load current and a superimposed AC triangular ripple current as in FIG. 3a. This implies that the inductor L must store a DC energy W equal to:

$$W = \tfrac{1}{2} L I^2 \tag{1}$$

Figure 3B:
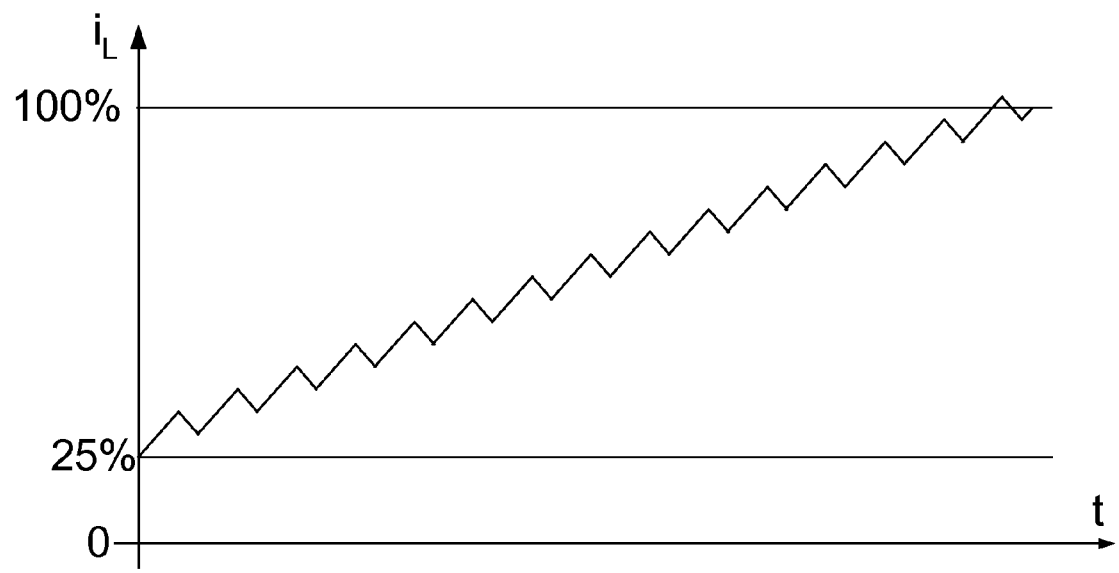

Herein lies one of the major limitation of the prior-art buck converter and all conventional switching converters currently known: they all must store this energy every cycle. As a direct consequence, the converter can not respond immediately to a sudden change of the load current demand, such as from 25% of the load to the full 100% load as illustrated in FIG. 3b. Instead, the buck converter must pass through a large number of switching cycles (typically 100 or more) before the instantaneous inductor current settles at the new steady state which has a full DC load current. The same holds true for the opposite step-load current change from 100% to 25% load current change.

Figure 4A:
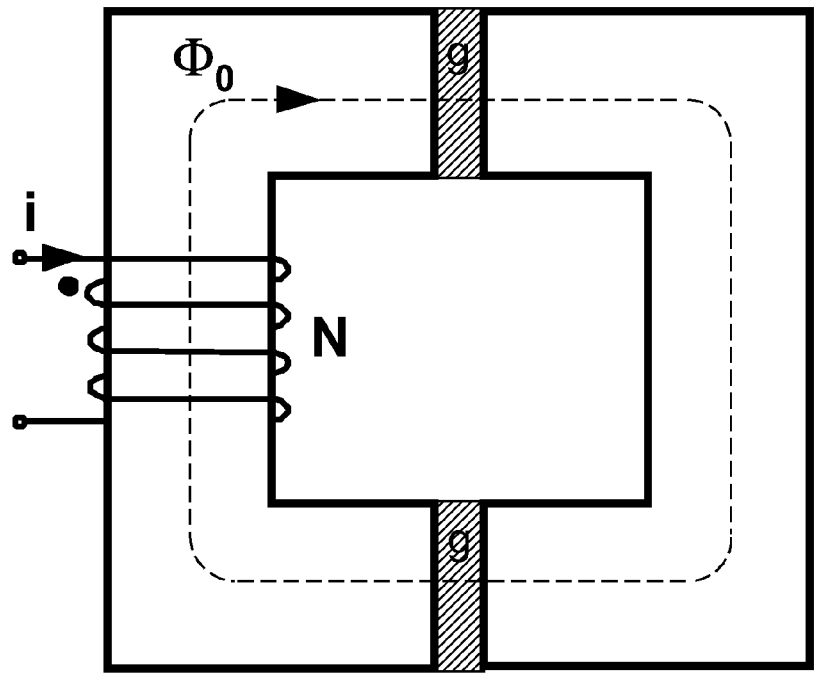
FIG. 4a is a magnetic core with the air-gap needed for inductor of buck converter in FIG. 1a, and FIG. 4b shows the inductor current with DC-bias and corresponding flux linkages.
Figure 4B:
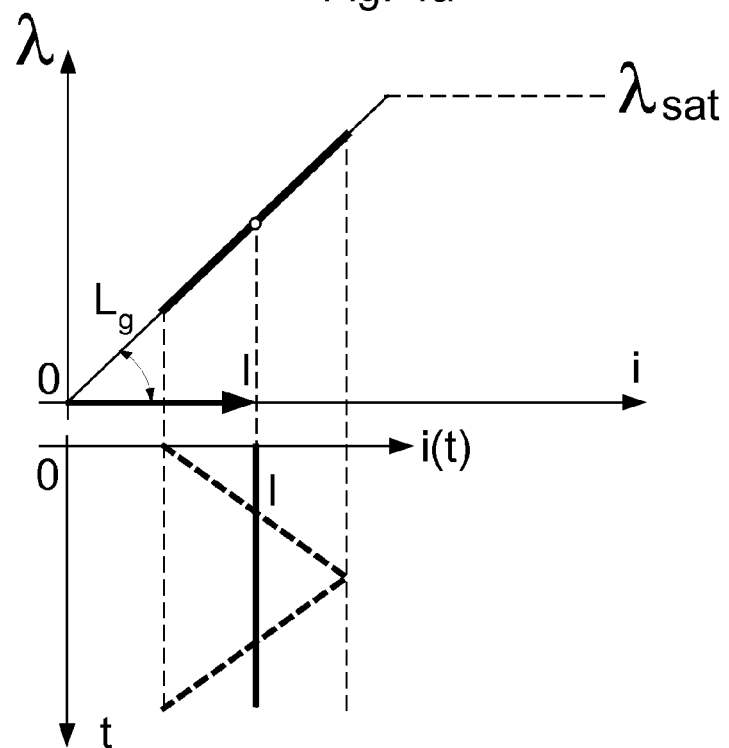

In order to store the DC energy given by (1) inductor must be built with an air-gap such as shown in FIG. 4a, whose size is directly proportional to the DC energy, which needs to be stored. Clearly, addition of the air-gap reduces the inductance L dramatically, and therefore further increases the size of the core needed to provide acceptable AC ripple current of around 20% peak to peak relative to DC current I. Ultimately, for a very large DC currents (100 A or more), the air-gap needed is so large, that the magnetic core only increases inductance of the winding by a factor of two or three compared to an inductor winding of the same size without core material. Considering that present day ferrite material have a relative permeability of 2,000 or more, that results in reduction of inductance by a factor of 1000.

Figure 5A:
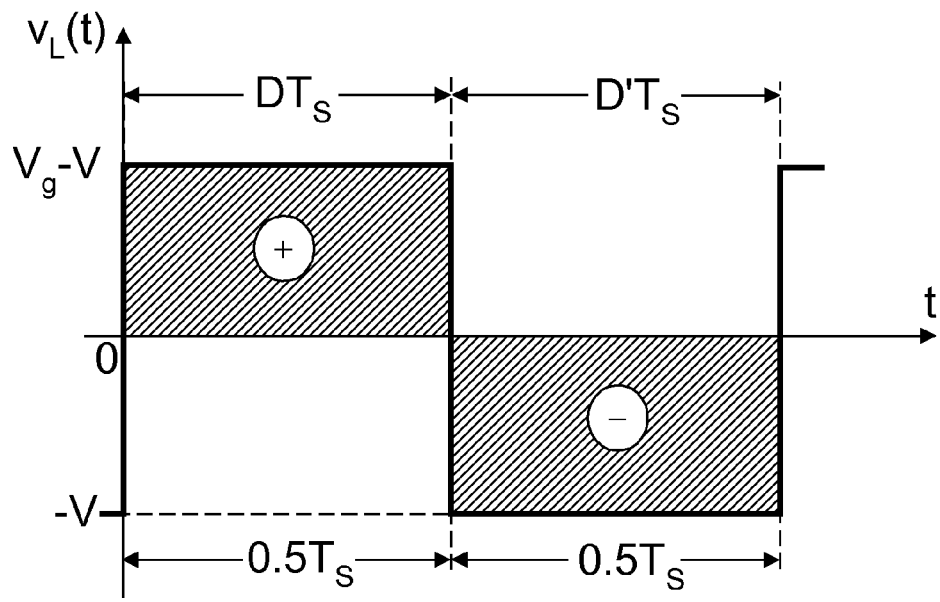
FIG. 5a illustrates the volt-second requirements for the inductor of the buck converter in FIG. 1a and FIG. 5b shows the volt-seconds as a function of the duty ratio D.
Figure 5B:
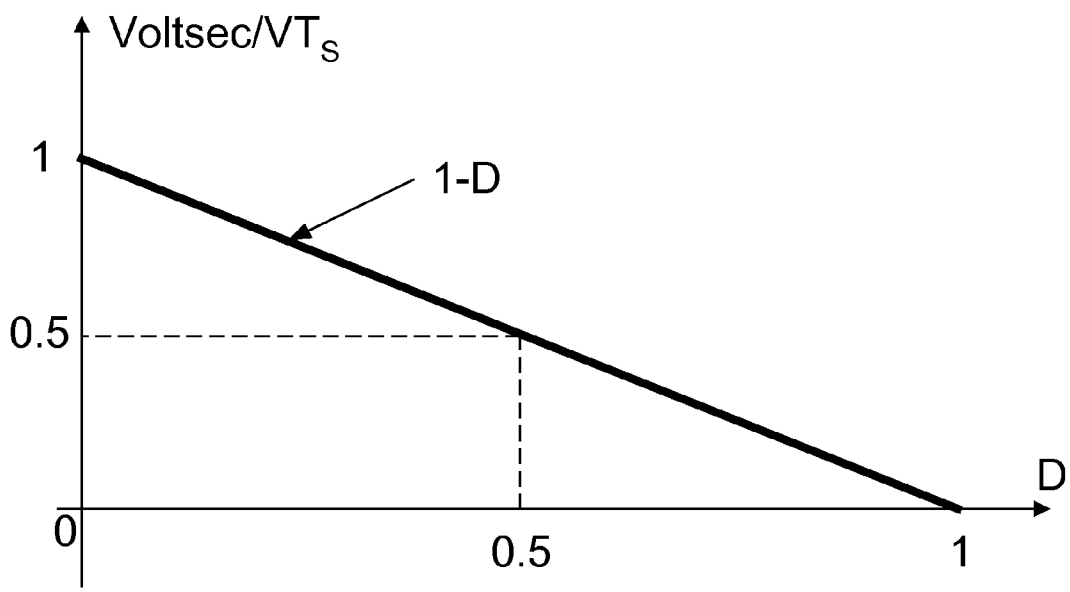
Figures 7A, 7B, 7C, 7D:
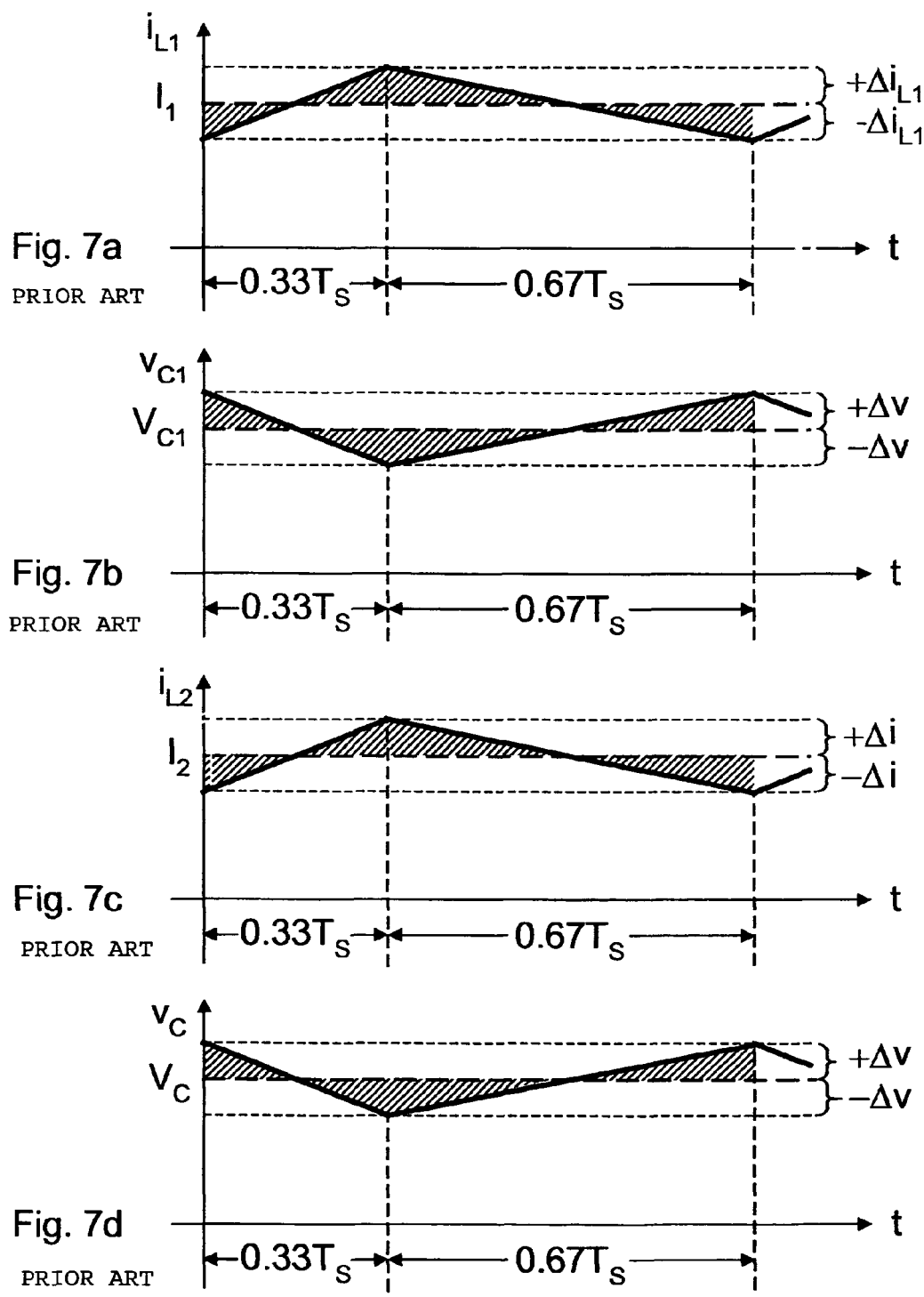
FIG. 7a, FIG. 7b, FIG. 7c, and FIG. 7d illustrate the energy transfer in SEPIC converter via AC ripple currents and AC ripple voltages.

Size of the inductance is therefore severely affected by its need to store the DC energy (1). However, inductor size is in addition also required to be very large because it must also support a superimposed AC flux as seen in FIG. 6b. This AC flux is very large due to large volts-seconds imposed on the core as given by:

$$\text{Volt-sec} = V(1-D)T_S = \tfrac{1}{2} V_g T_S \tag{2}$$

at duty ratio D of 0.5 (FIG. 5a). The graph of Volt-seconds as a function of duty ratio is shown in FIG. 5b.

Note that for large step down (D small), the volt seconds are approaching $VT_S$, where V is regulated output DC voltage V.

In summary, the size of the inductor L in the prior-art buck converter is very large due to the two basic requirements:
 a) need for large DC energy storage;
 b) large AC volt-seconds imposed on the inductor The present approaches to minimize inductor size was to increase switching frequency indiscriminately to the high levels, such as 1 Megahertz and even higher, so that small inductance values will be sufficient. This clearly impacts the efficiency. Therefore, an alternative method is presently adopted to handle high step-load current demands of the modern computer loads requiring 10 A per microsecond step-load current change, by using a number of buck converters of FIG. 1 in parallel, but shifted in their phase so that 4 converters in parallel, for example, result in 4 times higher effective filtering frequency. Up to ten converters in parallel are employed to handle this problem. This however, does not solve the problem of stored energy but only attempts to mitigate it somewhat.

High volt-seconds (and consequent large magnetic core size requirements) and DC-bias and air-gap seem to be inevitable in switching power conversion. However, this is not the case, as the new storage-less converter with step-down DC gain characteristic introduced in the next section will demonstrate. However, before introducing such storage-less converter the more detailed analysis of the energy transferring mechanism in another prior-art converter, the SEPIC (Single Ended Primary Inductance Converter) converter will reveal the reasons why such storage-less converter is possible.

Analysis of Prior-Art SEPIC Converter

Prior art SEPIC converter is shown in FIG. 6a, two inductor voltages and capacitor C current in FIG. 6b, and main switch S voltage and current waveforms in FIG. 6c. The implementation of state-space averaging method of (Ref 1 and Ref 4) will provide the steady state characteristic of the converter. This converter will now have DC-bias currents, $I_1$ and $I_2$ in both inductors.

First observation is that these DC-bias currents are just a nuisance as they were in the prior-art buck converter and they are not at all needed for the energy transfer from input side to the output side as the subsequent discussion reveals.

The DC voltage $V_C$ on capacitor C and output voltage V can also be found as:

$$V_C=V_G, V=DV_g/(1-D) \quad (3)$$

and switch S voltage blocking requirement $V_B$ as:

$$V_B=V+V_G=V_G/(1-D) \quad (4)$$

Clearly these high DC voltages impose not only large voltage stresses on both switches, they in turn also impose a very large volt-seconds on the two inductors, which, just like in a buck converter need a very large magnetic core sizes for the two inductors.

The second observation is that the large volt-seconds imposed on the two inductors are also not necessary for the energy transfer from input to output, as it will be disclosed in the next section.

Both above observation are now supported by the actual waveforms of the instantaneous currents in two inductors and instantaneous voltage of the energy transferring capacitor C as shown in FIG. 7a, FIG. 7b, FIG. 7c, and FIG. 7d. Shown shaded in these figures are the AC ripple currents in inductors and AC ripple voltages on capacitors, which are the only quantities which participate in the transfer of energy from input DC source to output DC load. For example, during on time interval, the AC ripple current of the input inductor increases while the AC ripple current of capacitor C decreases, etc, so that the energy is transferred from input to output in little AC energy storage chunks.

Thus, it seems plausible, that the energy transfer can be made with inductors, which have no DC-bias and the capacitors, which also have no DC-bias. Such converter is indeed possible but is subject of a separate patent application. Here we explore a converter, which despite the large capacitor voltage, has extremely low volt-seconds hence requires a very small size core (up to 400 times smaller then equivalent prior-art buck converter) and does that without a DC-bias in inductor.

Objectives

The main objective is to replace the current prior-art buck converter with an alternative solution which exceeds by far the performance of the buck converter in terms of much higher efficacy, much reduced size and weight, but most importantly to also provide the storageless converter operation, which none of the existing converters including prior-art back have.

SUMMARY OF THE INVENTION

Basic Operation of the Storageless DC-DC Converter

The present invention is shown in FIG. 6a. The switching topology features a rather unorthodox switching configuration consisting of four switches, two of which, the current rectifiers $CR_1$ and $CR_2$ each contain an inductor in series, the resonant inductors $L_{r1}$ and $L_{r2}$. Such a configuration is not allowed in conventional square-wave and resonant switching converters (Ref 2). However, here it is essential for its operation and is made possible by the new operating method using an AC resonant mode of operation. Note further that the two active switches S, and S' are switching out of phase, when one is ON, the other is OFF and vice versa as per timing diagram of FIG. 8b. The two passive current rectifier switches $CR_1$ and $CR_2$ are, however operating in-phase with their respective controlling switches S and S' as per switching timing diagram in FIG. 8b in their basic operation providing a fixed 2:1 stepped-down conversion ratio. However, we will also demonstrate how the current rectifiers $CR_1$ and $CR_2$ can also be turned of at times different than dictated by the active controlling switches S and S'. This feature will be utilized to introduce the continuous DC voltage control of the output voltage in addition to the fixed step-down conversion gain.

Therefore, two switching states of active switches S and S' define also two distinct linear switching networks as follows:
a) for interval $D'T_S$ shown in FIG. 9a and FIG. 9b;
b) for interval $DT_S$ shown in FIG. 10a and FIG. 10b.

Figure 9A:
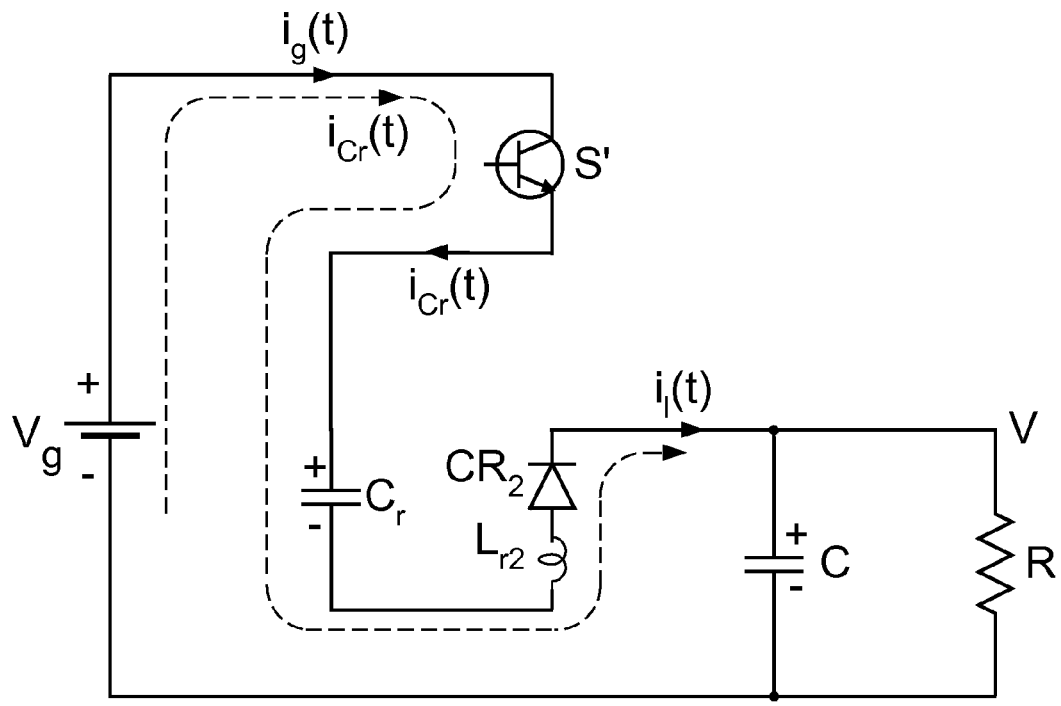
FIG. 9a and FIG. 9b illustrate linear switched network for converter of FIG. 8a for OFF-time interval $D'T_S$.
Figure 9B:
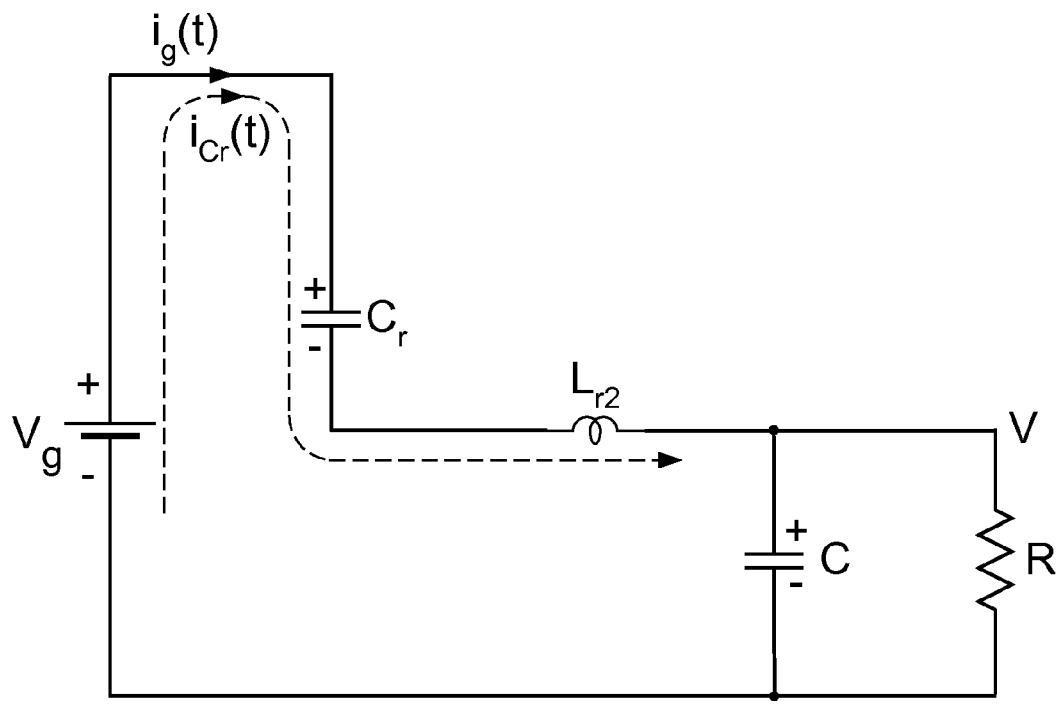
Figure 11A:
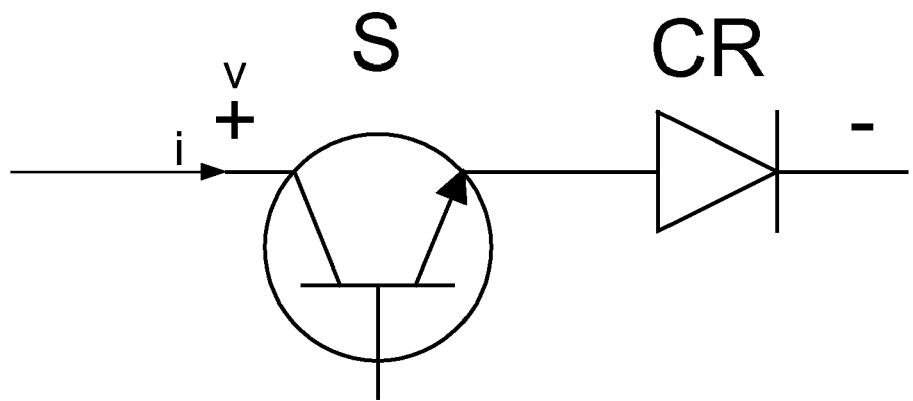
FIG. 11a illustrates the composite Voltage bi-directional switch (VBS) obtained by series connection of transistor and diode.
Figure 11B:
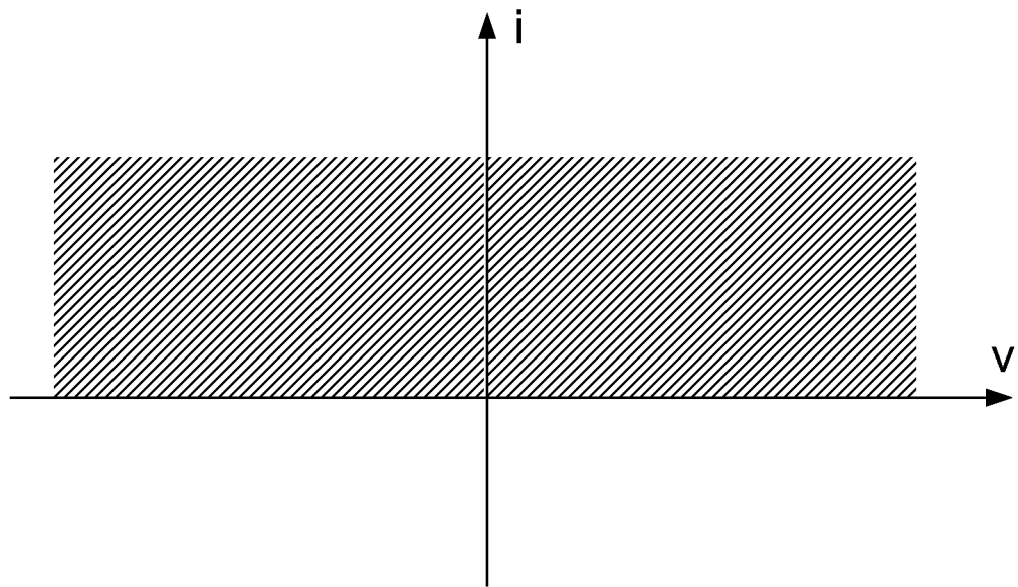

The two switching devices S' and $CR_2$ are intentionally displayed in FIG. 9a to emphasize the fact that they form during ON time interval a composite two-quadrant voltage bi-directional switch (VBS), which can block the voltage of either polarity but can only conduct the current in one direction dictated by the current rectifier ON current. The VBS switch composed of one-quadrant bipolar transistor active switch S and one-quadrant current rectifier switch CR depicted in FIG. 11a results in the two-quadrant switch operation illustrated by shaded areas in FIG. 11b.

The key point is that the current in the linear switching network of FIG. 9a can only flow in one direction, which is charging the resonant capacitor $C_r$. Once the two switching devices are represented by their ideal short circuit condition, the linear switching network of FIG. 9b is obtained.

This also points out to a key clear distinction with the prior-art square-wave switching method illustrated earlier by the prior-art buck converter and prior-art SEPIC converter. In both converters, the inductors need the whole switching period to be volt-second balanced: during ON time there are positive volt-seconds (and increasing AC flux in the magnetic core) and during OFF time there are negative volt-seconds (and decreasing AC flux or resetting of core flux). Note that in the new converter of FIG. 8a this is not the case: the inductor $L_{r2}$ is both set and reset during the same OFF time interval $D'T_S$. The same holds true for the other inductor $L_{r1}$ during the ON time interval. During this $D'T_S$ time interval, the resonant capacitor $C_r$ is charging from the input source and conducts its charging current to the load at the same time.

Figure 10A:
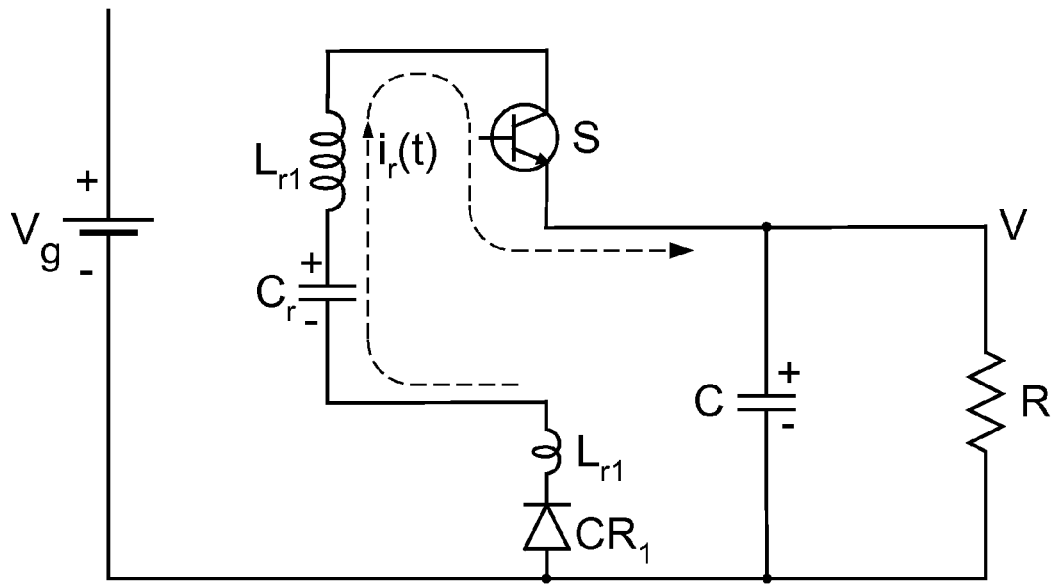
FIG. 10a and FIG. 10b illustrate linear switched network for converter of FIG. 8a for ON-time interval $DT_S$.
Figure 10B:
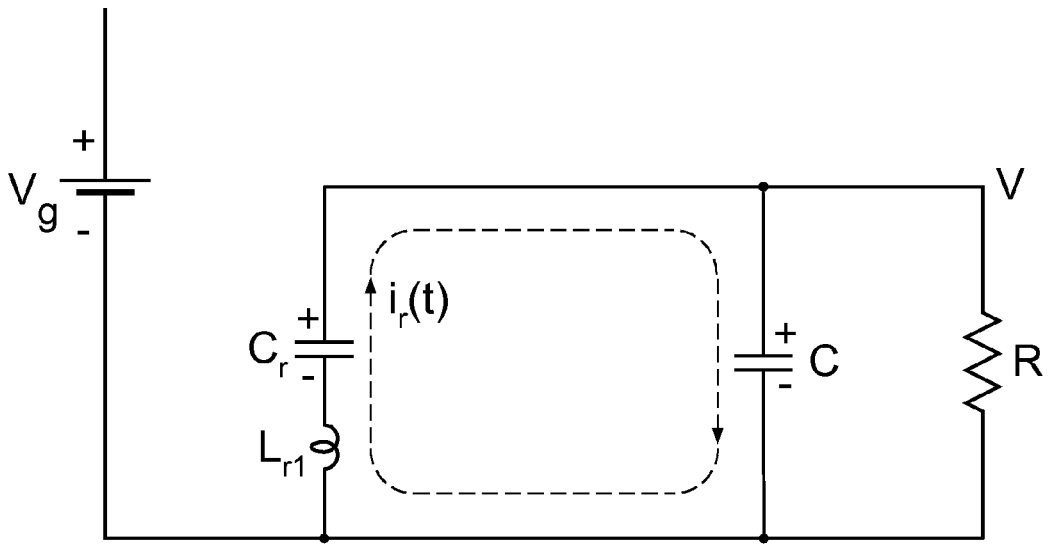

During ON time interval $DT_S$, the switches S and $CR_1$ are now in series, as illustrated in switching linear circuit of FIG. 10a. Once again the two switches in series form effectively another VBS switch and therefore allow current in only one direction, which is direction dictated by current rectifier $CR_2$. During this time the resonant capacitor is fully discharging the charge stored in previous interval and delivering it to the load as illustrated in FIG. 10b.

We now extend the state-space averaging method (Ref 1 and Ref 4) to handle the case of the two inductors each being volt-second balanced separately during each individual ON-time and OFF-time intervals respectively and not over the entire switching period as for square-wave switching converters. By writing the volt-second balance for each inductor in their respective switching interval we impose that net DC voltage across each inductor must be zero for each of the two intervals so that:

For interval D'T$_S$:

$$\int v_{Lr2} dt = V_g - (V + V_{cr}) = 0 \qquad (5)$$

For interval DT$_S$:

$$\int v_{Lr1} dt = V_{cr} - V = 0 \qquad (6)$$

The solution of (5) and (6) results in a unique solution for both V and V$_{cr}$ as:

$$V = V_{cr} = \frac{1}{2} V_g \qquad (7)$$

Therefore the basic conversion function of the present invention is obtained as that of a fixed step-down conversion of 2:1 independent of duty ratio and independent of particular values of two inductors $L_{r1}$ and $L_{r2}$. The special value of output DC voltage V and the voltage V$_{cr}$ equal to 50% of the input DC voltage given by (7) plays a crucial role in making possible at least a hundredfold reduction of the size of the magnetics compared to the prior-art buck converter.

Figure 12A:
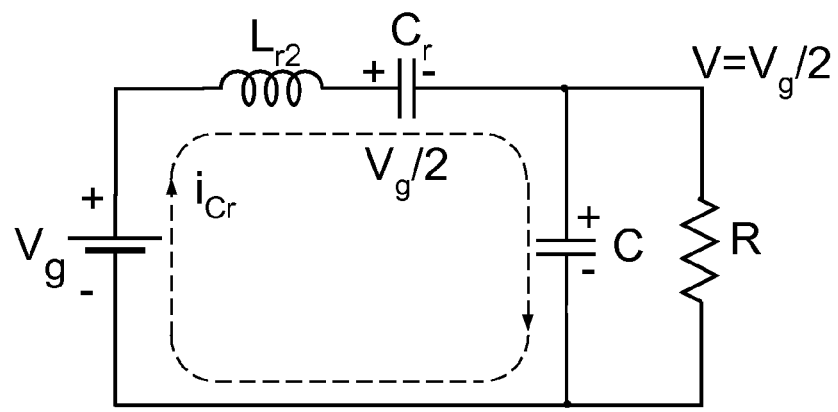

Under the condition (7) in the equivalent circuit model of FIG. 12a, the three DC voltages exactly balance, therefore effectively eliminating any net large DC voltage from the circuit operation. What is left is the AC ripple voltage Δv of the capacitor C$_r$, which is typically 100 times smaller than the respective DC voltage due to typical requirement for 1% relative ripple of the output DC voltage. Therefore, the size of the inductors will be at least 100 times reduced compared to that of the prior-art buck converter.

This therefore, reduces the equivalent circuit of FIG. 12a to an effective linear resonant circuit as opposed to the large square-wave switching imposed on the conventional series or parallel resonant converter (Ref 3). In the prior-art resonant converters, a single resonance is spanning both parts of switching interval and thus leading to many related problems: large size of resonant components, large voltage and current overstresses much beyond those of square-wave switching. The only benefit for such resonant switching was in possibility of zero-current switching under special conditions. Here we will obtain both zero voltage and zero current switching of all four switches as a result of the basic operation of the converter.

Figure 12B:
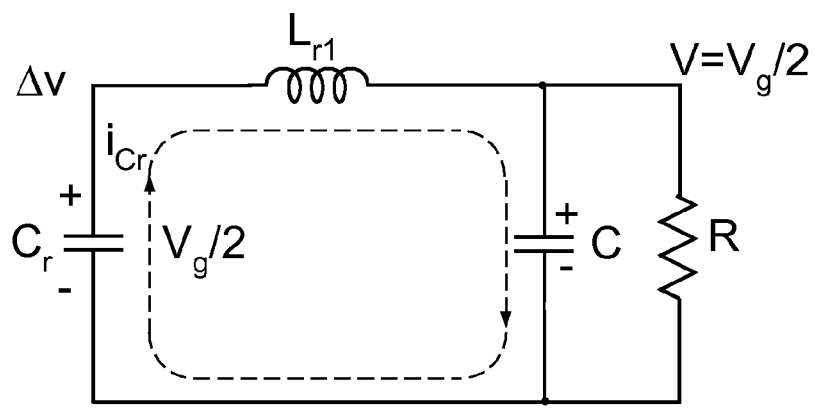

The same conditions now apply to the equivalent circuit of FIG. 12b, in which now DC voltages of resonant capacitor and output DC voltage exactly cancel, leaving once again only the AC ripple voltage Δv of the resonant capacitor to drive the resonant circuit of FIG. 12b.

Let us now derive the simple analytical expressions for the resonant capacitor current i$_{cr}$ for a special case when:

$$L_{r1} = L_{r2} = L_r \qquad (8)$$

Each resonant inductor forms with the resonant capacitor C$_r$ a resonant circuit. However, for special case (8) two resonant frequencies are identical leading to the same resonant interval T$_r$ given by:

$$T_r = \frac{1}{f_r} = 2\pi \sqrt{L_r C_r} \qquad (9)$$

We can now also take a very special case:

$$T_r = T_S \qquad (10)$$

Figure 13A:
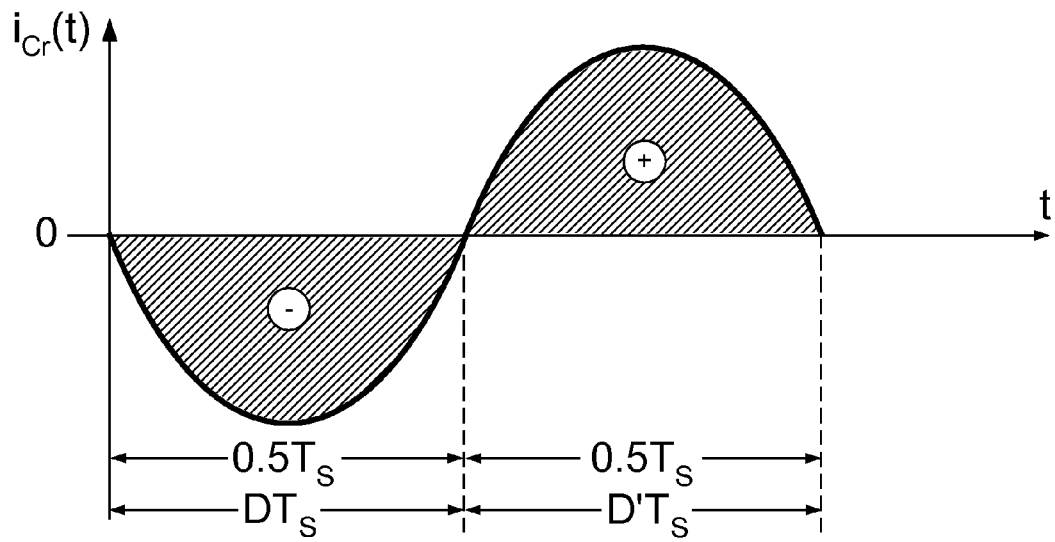

Or alternatively that:

$$f_r = f_s \qquad (11)$$

that is switching frequency is equal to resonant frequency. In that special case the resonant capacitor current I$_{cr}$ is as illustrated in FIG. 13a composed of two half-resonance intervals, which effectively form a single sinusoidal resonant capacitor current i$_{cr}$ given by:

$$i_{cr}(t) = I_P \sin(\omega_r t) \qquad (12)$$

From the resonant circuit for each interval, we have:

$$L_r di_{cr}/dt = -\Delta v \qquad (13)$$

whose solution is:

$$v_{cr}(t) = -\Delta v \cos(\omega_r t) = -R_N I_P \cos(\omega_r t) \qquad (14)$$

where $$R_N = \sqrt{L_r C_r} \qquad (15)$$

is a natural resistance of the resonant circuit.

Figure 13B:
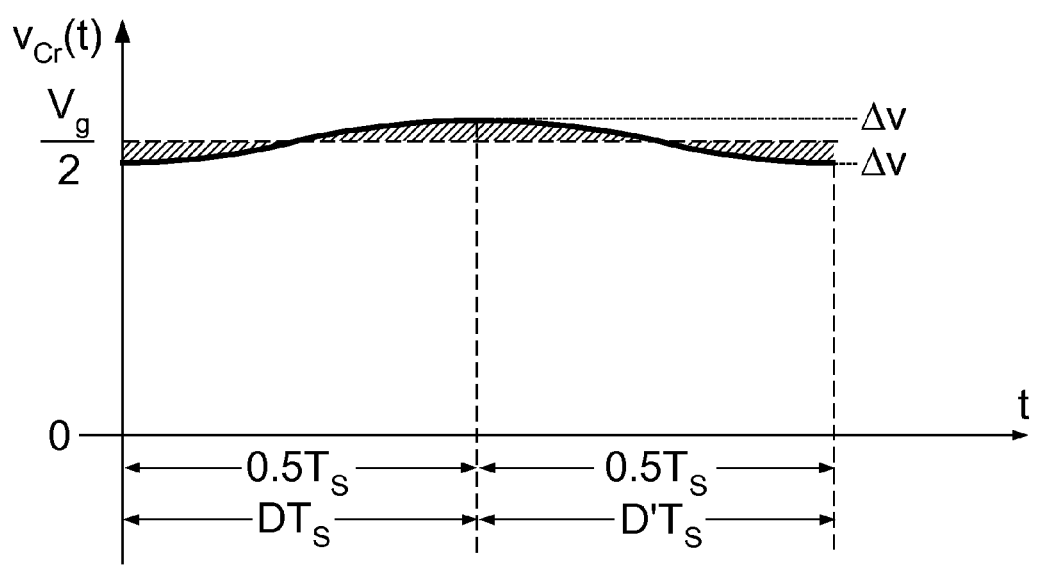
FIG. 13b illustrates resonant capacitor $C_r$ voltage.

The time domain waveform of the resonant capacitor voltage v$_r$ is illustrated in FIG. 13b. Note that the small AC ripple capacitor voltage Δv is superimposed on top of large DC voltage V$_g$/2. However, as described earlier, the large DC voltage does not take part in the resonance, but only a small AC ripple voltage. Note also how the capacitor AC ripple voltage is zero in the middle of each interval, which marks the instant when the volt-seconds imposed on respective resonant inductors change the polarity so that at the end of each ON-time or OFF-time interval each resonant inductor is volt-second balanced.

Comparison of Magnetics Sizes

Figure 14A:
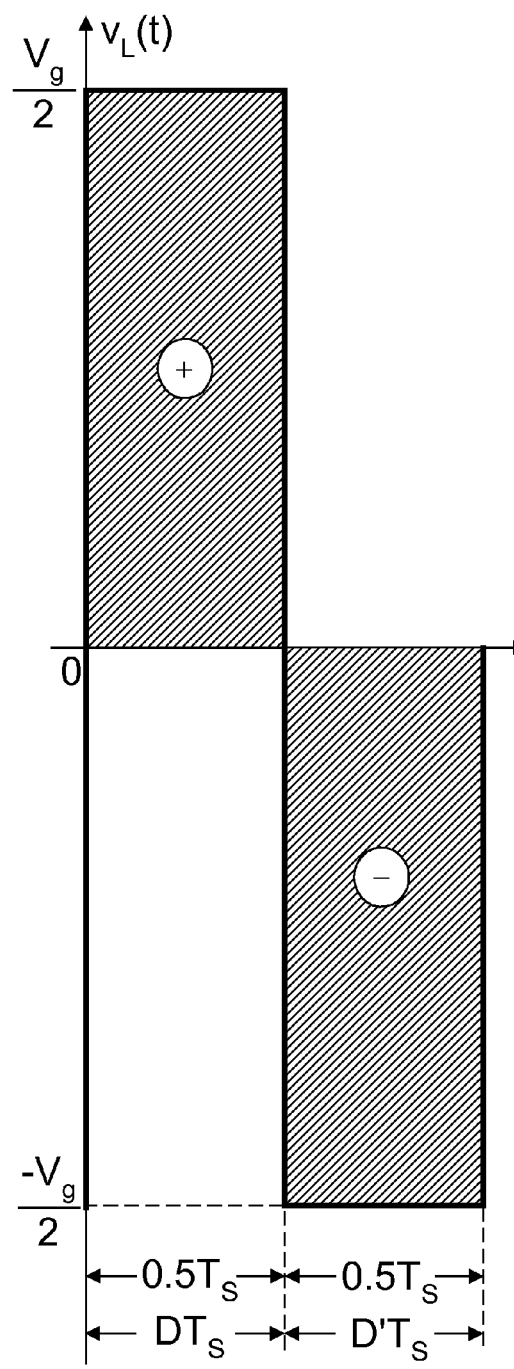

The size of the inductors of the prior-art buck converter and present invention can be now easily compared. The buck converter operation at 50% duty ratio results in identical 2:1 DC voltage step down. For the buck converter, the respective inductor AC voltage waveform is shown in FIG. 14a. The corresponding volt-seconds are given by:

$$\text{Volt-seconds} = \frac{1}{2} V T_S \qquad (16)$$

Figure 14B:
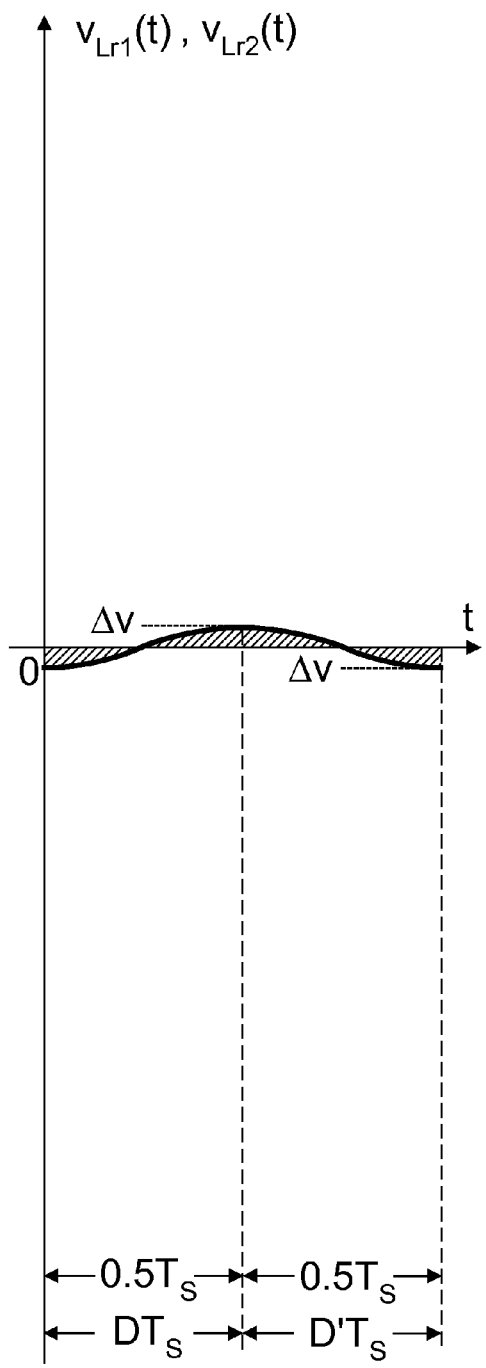

The volt-seconds for resonant inductor L$_r$ of FIG. 14b can be approximated as:

$$\text{Volt-seconds} = \frac{1}{8} \Delta v T_S \qquad (17)$$

Leading to their ratio R of:

$$R = \frac{1}{4} \Delta v / V \qquad (18)$$

In practical applications it is often required that the relative output DC voltage ripple be:

$$\Delta v / V = 0.01 \qquad (19)$$

or 1%. For example, for 5V converter DC output, 50 mV AC ripple voltage is typically required. Therefore, for the operation at the same switching frequency and resulting in the same DC conversion ratio of 2:1, the present invention needs can use magnetic core, which is 400 times smaller than in an equivalent buck converter. Furthermore, both resonant inductors do not have a DC-bias such as inductor in the prior-art buck converter, which further leads to their minimal size.

DC Current Conversion Ratio

Figure 15A:
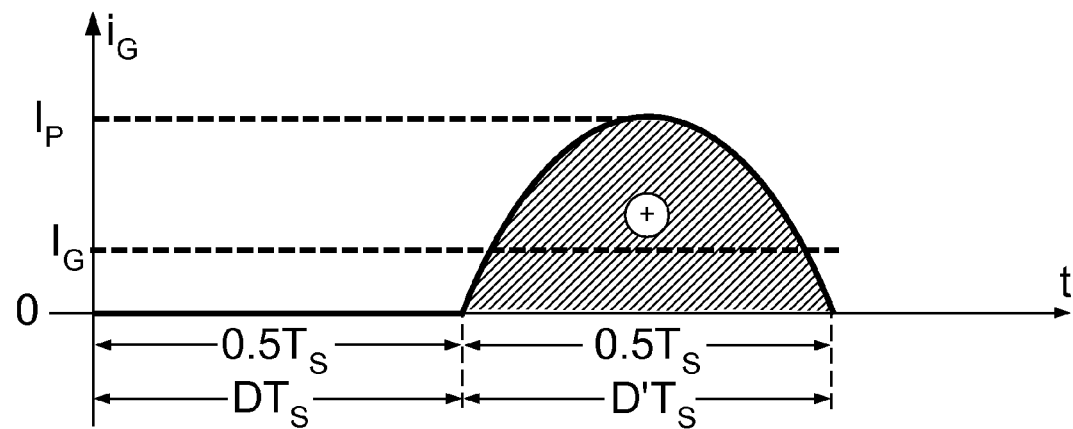
Figure 15B:
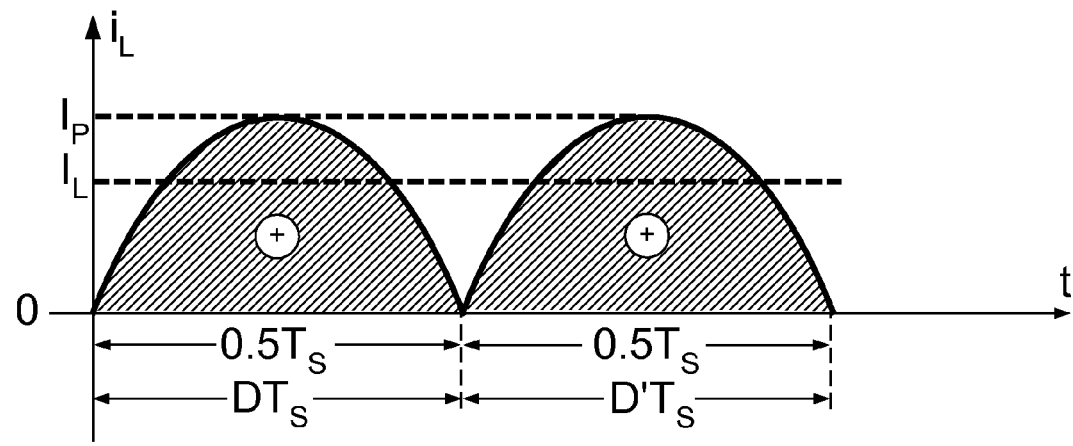

It is now instructive to compare the DC current conversion ratio of the present invention. FIG. 15a shows the instantaneous input current of the converter in heavy lines and average source current I$_G$ in dotted lines. Likewise, FIG. 15b shows the instantaneous output current of the converter in heavy lines, while the dotted lines represent the DC load current I$_L$. Now we can establish from FIG. 15b the correlation of I$_P$ and DC load current I$_L$ as:

$$I_P = \pi/2 I_L \qquad (20)$$

Storageless Operation of the Converter

Figure 16A:
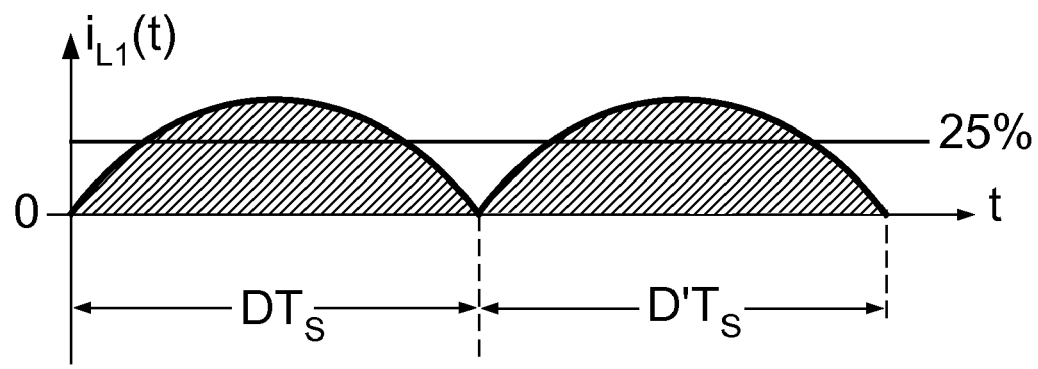
FIG. 16a illustrates output load current at 25% of the full load current and FIG. 16b illustrates output load current at 100% load current.
Figure 16B:
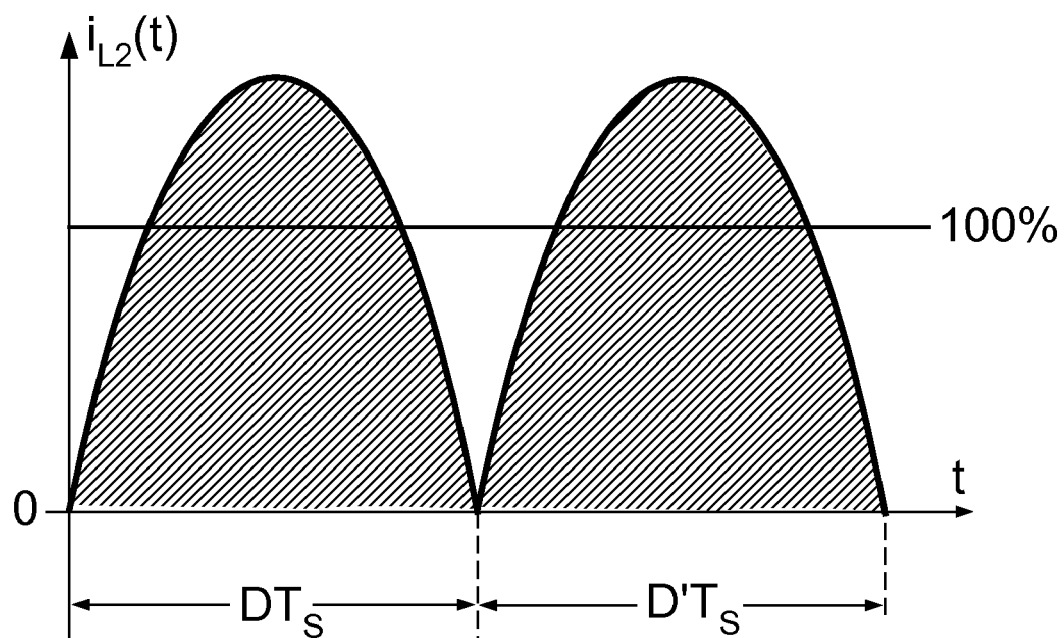

Note that the two resonant inductors $L_{r1}$ and $L_{r2}$ (FIG. 8a) are AC inductors and do not have a DC-bias. Furthermore, in each subinterval $DT_S$ and $D'T_S$, the respective resonant inductor currents start and finish at zero current level. The absence of DC-bias makes the present invention ideal for applications requiring large and fast step-load current change such as in Voltage Regulator Modules (VRM) for the demanding high current computer loads with fast step-load current changes. As seen from equation (20) and the waveforms in FIG. 15b, the DC load current $I_L$ directly correlated with the peak resonant current $I_P$ so that the sudden demand in DC load current is on single cycle basis connected to the corresponding required current change in the resonant capacitor current. Therefore, the load current as illustrated by the waveforms in FIG. 16a and FIG. 16b demonstrates the instant change for demand from 25% to 100% since there is no storage in the air-gap of the inductor.

Conversion Efficiency and Elimination of Switching Losses

At first it may appear that charging and discharging the resonant capacitor $C_r$ could introduce extra losses. However, the opposite is the case. Note that during the $D'T_S$ interval the resonant capacitor $C_r$ is charging from input source directly with the DC load current. On the other hand, during the $DT_S$ interval, the same capacitor is now discharging directly into load. Therefore, its charge and discharge are used to effectively supply the load current at all times therefore reducing the output ripple voltage and minimizing filtering requirements.

The resonant charge and discharge of the capacitor has also another benefit for conversion efficiency as seen from the switching characteristics for all four switches shown in FIG. 17a, FIG. 17b, FIG. 17c, and FIG. 17d. Note that the two current rectifiers are switching under ideal conditions of zero voltage and zero-current eliminating both ON and OFF switching losses.

Similarly, the two active switches are turned ON and OFF at zero current as well. Clearly, such operation of switches is completely unique to this converter and is one of reasons for its ultra efficient operation in addition to extremely small size of the converter.

Operation with Different Resonant Frequencies

The present invention is not limited to operate with the same resonant frequencies defined by same resonant inductances $L_{r1}$ and $L_{r2}$ as assumed until now. For example, by choosing the two resonant inductors so that:

$$L_{r2} = 4 L_{r1} \quad (21)$$

The switching interval now consists of two different resonant intervals, $T_{r1}$ and $T_{r2}$ so that:

$$T_S = T_{r1} + T_{r2} \quad (22)$$

and $$T_{r2} = 2 T_{r1} \quad (23)$$

Figure 18A:
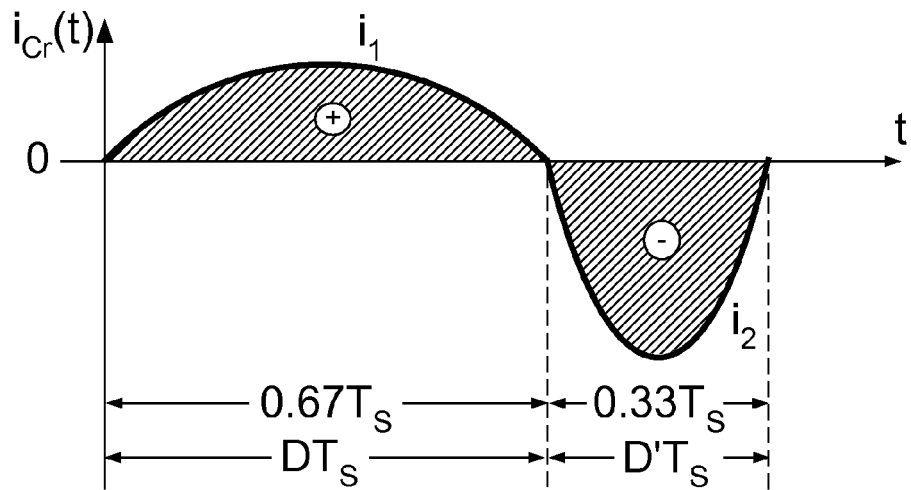
FIG. 18a illustrates the resonant capacitor current.
Figure 18B:
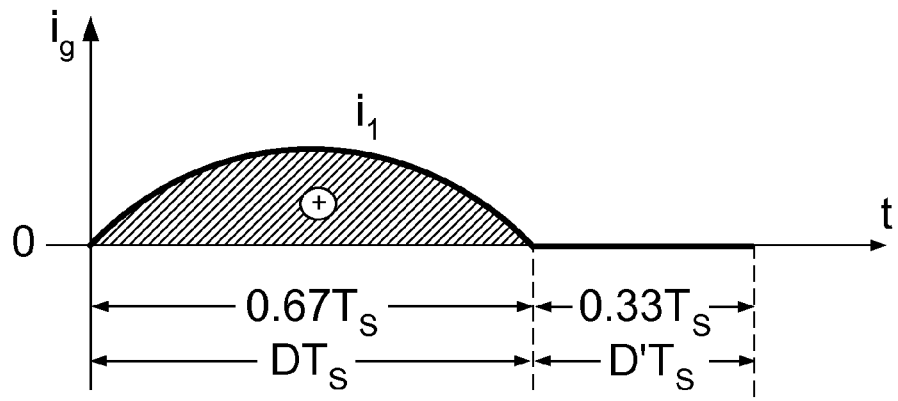
FIG. 18b illustrates the input current.
Figure 18C:
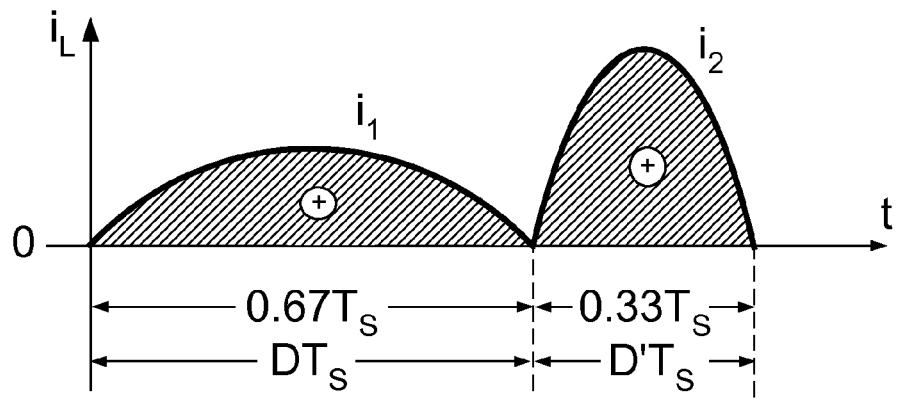
FIG. 18c illustrates the output current of the converter in FIG. 8a for the case when $L_{r2}=4L_{r1}$.

This operation is illustrated by the waveforms in FIG. 18a, FIG. 18b, and FIG. 18c.

Experimental 20V to 10V Step-Down Converter

The experimental 20V to 10V DC-DC step down converter operating at a constant current load of 1 A was built to verify the key performance features. The following resonant components were used:

$$L_{r1}=3.6 \ \mu H \quad L_{r2}=12.3 \ \mu H \quad C_r=4.7 \ \mu F \quad (24)$$

The other components used:

Two MOSFETs: IRF 530, two current rectifiers:
50SQ100(100V, 5 A) (25)

Figure 20A:
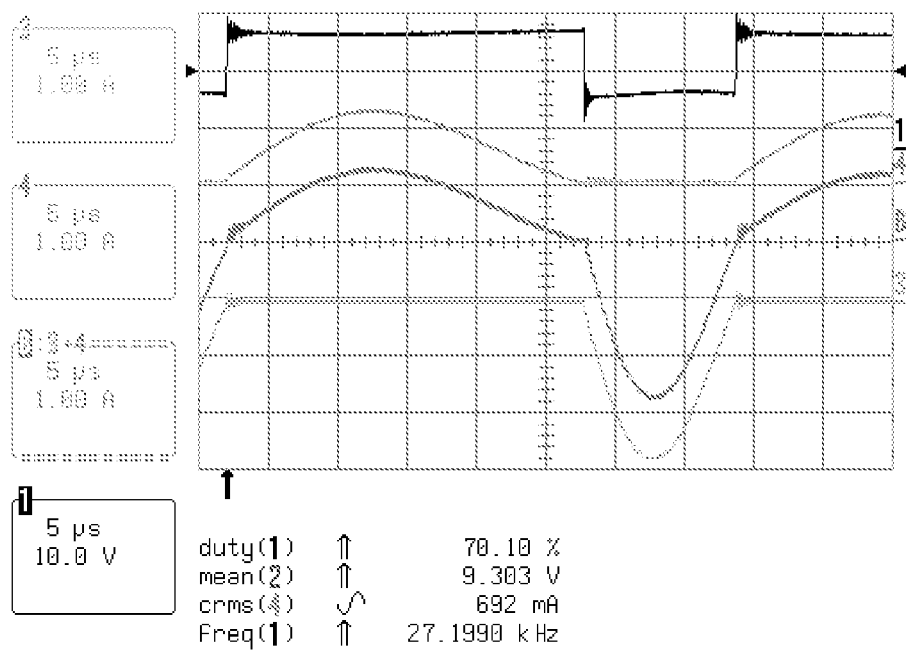
FIG. 20a and FIG. 20b illustrate the experimental waveforms obtained when both duty ratio and the switching frequency change are used to control output DC voltage.

Operation at zero current level was obtained at approximately 0.7 duty ratio and switching frequency of 27 kHz as seen in the experimental waveforms of FIG. 20a, which agree quite well with the prediction. Shown in FIG. 20a from top to bottom are, voltage of switch S, current of resonant inductor $L_{r2}$, current of resonant capacitor $C_r$ and finally the current of the resonant inductor $L_{r1}$. Note how the resonant inductor currents start at zero current level and after respective half-cycle resonance return to zero at which instant the respective rectifier switches turn-OFF.

Figure 20B:
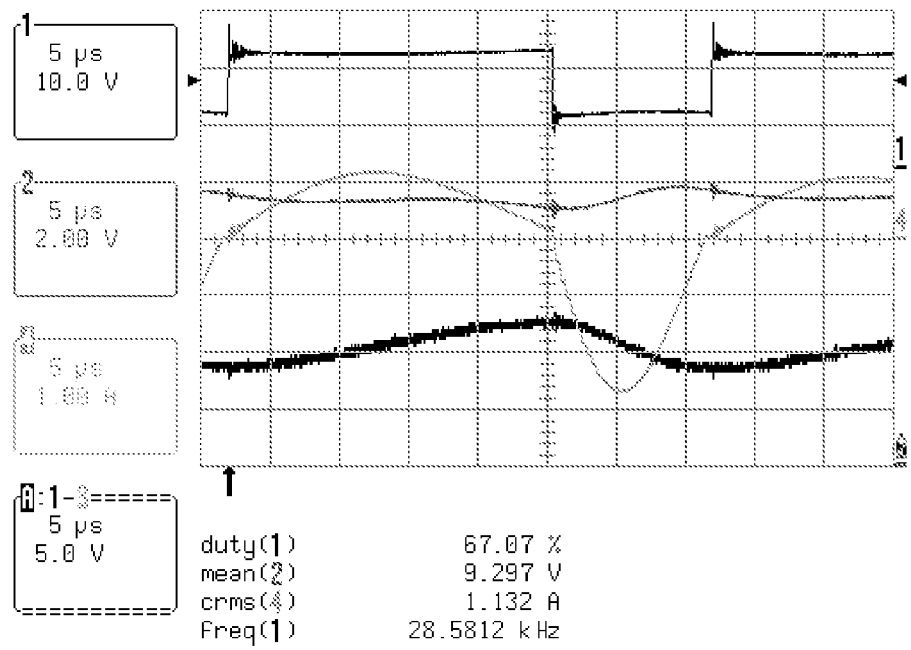

The waveforms in FIG. 20b show under approximately the same conditions, the output DC voltage (second trace) and the resonant capacitor voltage $v_{cr}$ (third trace), which shows its DC component equal to $V_g/2$ (in this case approximately 10V) and the superimposed AC ripple voltage showing a voltage ripple $\Delta v = 2V$. This clearly shows, how during the OFF time interval, the capacitor ripple voltage changes from $-\Delta v$ to $+\Delta v$, while during the subsequent ON-time interval changes back from $+\Delta v$ to $-\Delta v$ to complete one full cycle. It is this resonant capacitor ripple voltage over the full cycle, which is responsible for driving each of the two resonant inductors in their respective intervals of resonance. So the resonant capacitor ripple is responsible for generating each switching cycle full resonant current (directly proportional to the load current at that time). Thus, original conjecture that the capacitor DC voltages are nuisance and do not participate in the energy transfer from input to output is confirmed. Furthermore, the role of the two resonant inductors is also verified as is their small size, since they are excited by the small resonant capacitor AC ripple voltages and not the full scale DC voltages as in the prior-art buck converter and SEPIC converters.

Now we turn to how to add the continuous control of the output DC voltage in addition to the fixed 2:1 step-down conversion ratio.

Continuous Control of Output DC Voltage

So far it was established that the new storageless converter could provide a fixed step-down conversion of 2:1. However, of very practical importance is that the output voltage can be continuously controlled by use of one of the control variables, duty ratio of the main switch or switching frequency or both. In that case output voltage could be regulated despite the changes of the input voltage by use of the either feedback or feed forward control techniques or both. Note that the tapped inductor buck converters of FIG. 3a and FIG. 3b provide a fixed conversion step-down (such as 2:1 for example), but it also provided the additional continuous control of output DC voltage through duty ratio D control. The new converter also has control of output DC voltage and three alternative methods are described here.

Control with Duty Ratio and Switching Frequency

Figure 8A:
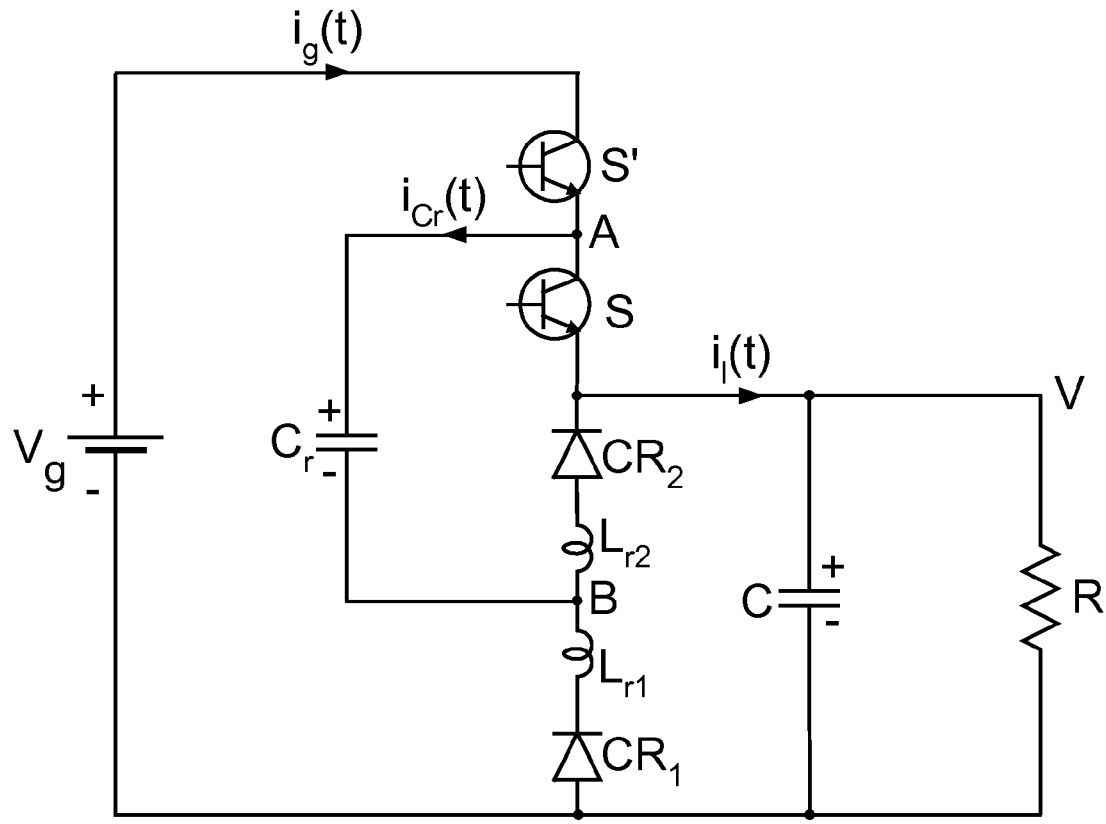
Figure 8B:
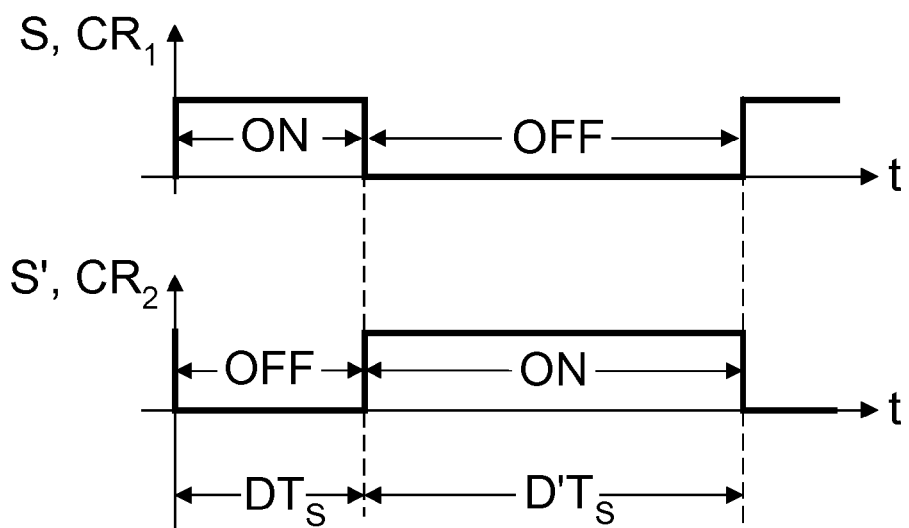
Figure 19A:
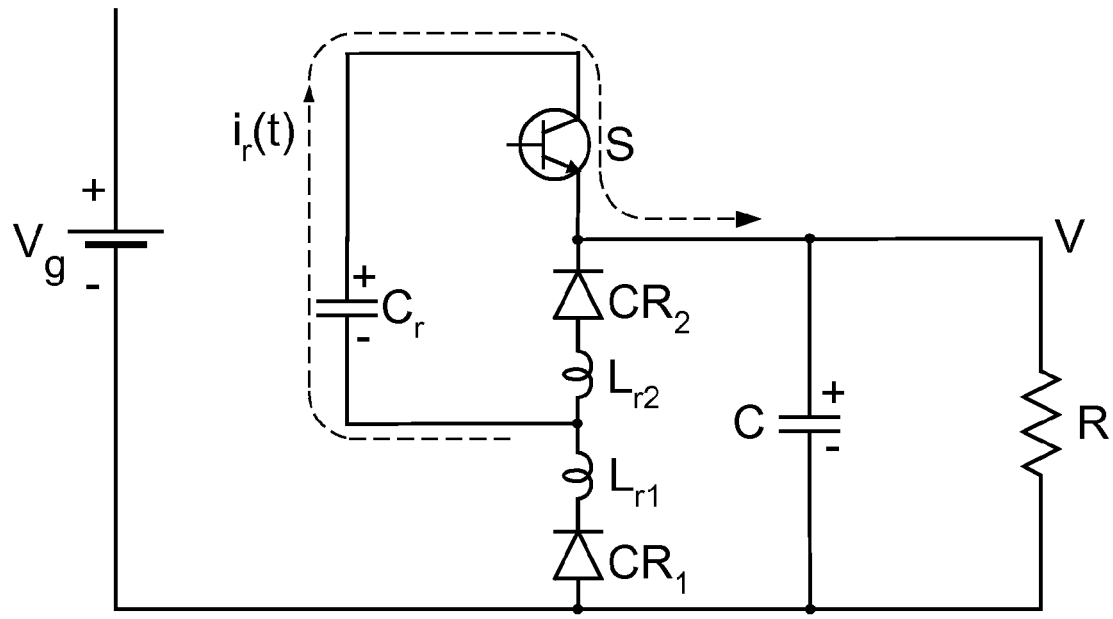
FIG. 19a illustrates the switched network obtained when S' switch is turned OFF before its respective resonant current is returned to zero and FIG. 19b illustrates the switched network when current rectifier $CR_2$ is turned-OFF.
Figure 19B:
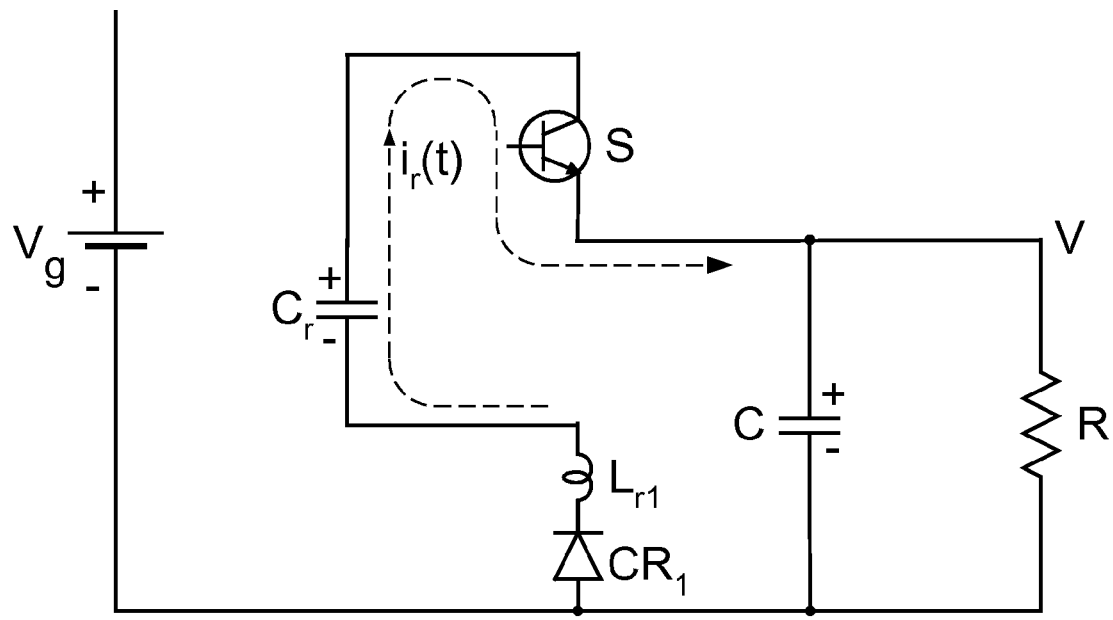

First we establish that the converter of FIG. 8a does not have to be operated with a simple switch strategy of FIG. 8b which implied that the two passive current rectifier switches are operated exclusively in response to their respective active switches and not dependent on the actual circuit conditions. However, due to special operation under the two resonant intervals, this is not the case. Note that each active switch can be turned-OFF before its respective resonant current reaches zero. For example, we consider here the case when S' switch is turned-OFF before the respective resonant current returned to zero current level. Actually, one might expect that the premature turn-OFF of the active switch S' in this case would not be allowed and would have a bad consequences for the converter operation. For one thing, S' switch turn-OFF could cause the respective current rectifier $CR_2$ in series with it also to turn-OFF as would have been predicted by the two-quadrant switch operation described in FIG. 11a and FIG. 11b. However, this is not taking place due to the presence of the resonant inductor $L_{r2}$ in series with this $CR_2$ switch, which still has the positive current flowing. The three switches highlighted in this figure illustrate that all three switches, S, and two current rectifiers are all turned ON during this time interval depicted by the linear switched network of FIG. 19a. As the current rectifier $CR_2$ is still conducting, the resonant capacitor DC voltage of $V_{cr}$ (initially $V_g/2$) is impressed across the resonant inductor $L_{r2}$ to cause the linear decrease of its current at a rate of $-V_{cr}/L_{r2}$ until this current is reduced to zero and current rectifier $CR_2$ is finally turned OFF. This is clearly visible in the three current waveforms of FIG. 21a, FIG. 21b, FIG. 22a and FIG. 22b depicting two resonant inductor currents and the resonant capacitor current, which is their algebraic sum (middle trace). Note also a very interesting feature observed in all four figures. At the instant when the switch S is turned ON its respective current rectifier $CR_1$ is also turned ON at that instant (as required by VBS switch operation) despite the fact that the current rectifier $CR_2$ is still ON and will be so for quite some time. Therefore, in this operational mode, there is a time interval during which both current rectifiers are ON. In conventional switching converters, one is working hard to avoid such overlapping conduction time of the two complementary switching diodes (such as in output of forward converter or in center-tap secondary rectification schemes, as such overlap would cause spikes and generally loss of efficiency). Here it is actually beneficial in providing smooth transition of diode switching their conduction times at different instants with no harm and detriment to circuit operation.

Note also that as the duty ratio D is increased (D' duty ratio decreased), the slope of discharge becomes smaller due to the fact that both resonant capacitor DC voltage reduces together with the output DC voltage bellow nominal voltage $V_g/2$.

In fact, by cutting short D'$T_s$ interval, the respective charge current is being modified in its shape. Despite the fact that capacitor charge and discharge currents must at all times be AMP-second balanced, it is this change of the shape of one current (charge) while the other current (discharge) is not changed, which does alter the respective net DC source current, while DC load current remains always the same. As this changes DC current conversion ratio, so must the opposing DC voltage conversion ratio to change, so the DC voltage control is introduced indirectly by the change of the shape of one of the two resonant capacitor currents.

Figure 21A:
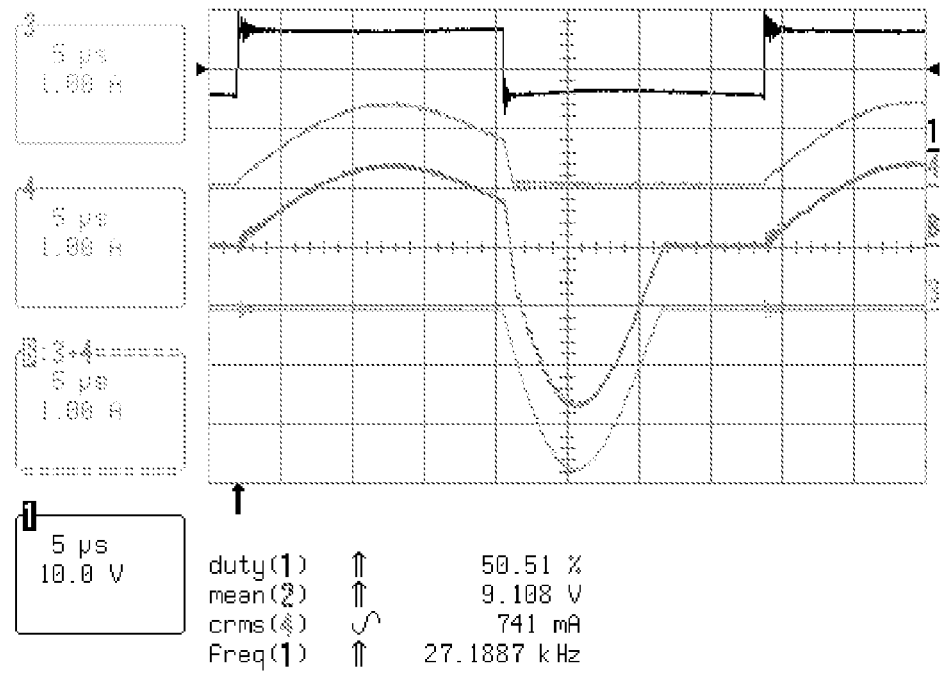
FIG. 21a and FIG. 21b illustrate the experimental waveforms obtained when both duty ratio and the switching frequency change are used to control output DC voltage.
Figure 21B:
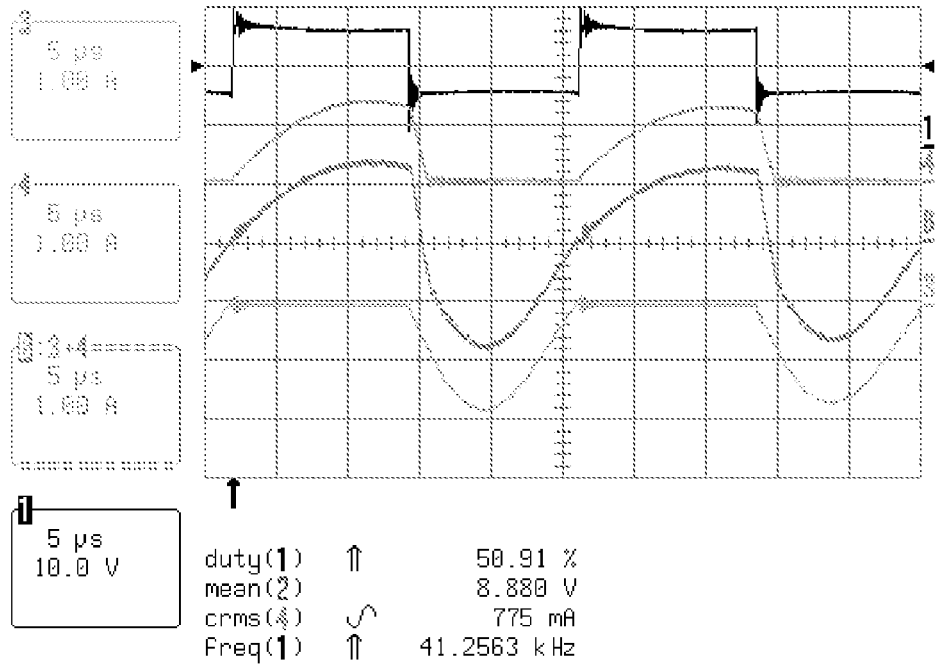

Comparison of FIG. 21a and FIG. 21b brings to light another important observation. First in FIG. 21a the duty ratio was changed from 0.68 to 0.5 to result in output DC voltage reduction from 9.38V to 9.1V. Note also the presence of the coasting zero interval after the current of resonant inductor $L_{r1}$ was reduced to zero, it stays at zero level until the end of switching cycle. This coasting interval can, however, be easily eliminated by simply increasing switching frequency to the point when the coasting interval is reduced to zero as is done and illustrated in FIG. 21b. Note how the peak resonant current of almost 3 A in FIG. 21a was reduced to approximately 2 A peak (still with the same duration) in FIG. 21b by simply eliminating zero-coasting interval. It is then obvious that for efficiency reasons, the coasting intervals should be avoided whenever possible. The added benefit of increased switching frequency and elimination of coasting interval is that the DC voltage is further reduced to 8.88V.

Figure 22A:
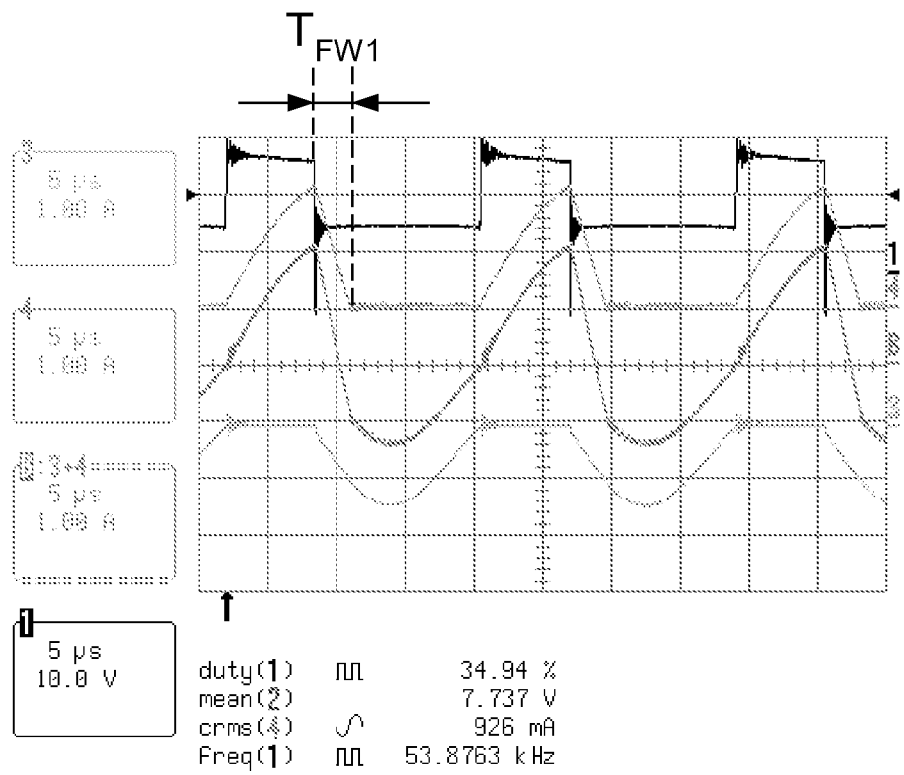
FIG. 22a designates the freewheeling conduction time, $T_{FW1}$, of the current rectifier $CR_1$ and the experimental waveform obtained when both duty ratio and switching frequency are changed to control output DC voltage FIG. 22b illustrate the experimental waveforms obtained when both duty ratio and the switching frequency change are used to control output DC voltage.

Continuous output voltage control is obtained by use of the new method in which the modulation of the freewheeling time $T_{FW1}$ designated in FIG. 22a is used. When the ON-time interval is being reduced and input switch S turned OFF before reaching end of half-resonance period, the respective rectifier $CR_1$ continues to conduct and linearly discharge its remaining stored energy in resonant inductor $L_{r1}$ during this freewheeling time $T_{FW1}$. It is the change and modulation of this time with the reduction of the ON-time, which leads to the continuous reduction of the output DC voltage. This method of control has thus the same characteristics of the duty ratio control of, for example, the conventional buck converter in Discontinues Inductor Current Mode (DICM) in which DC voltage conversion depends on both duty ratio D and DC load current I. The PWM duty ratio feedback control is then just as effective to regulate output voltage in the presence of both changes as in the Continuous Inductor Current Mode (CICM) when DC conversion gain depends on duty ratio D only.

Figure 22B:
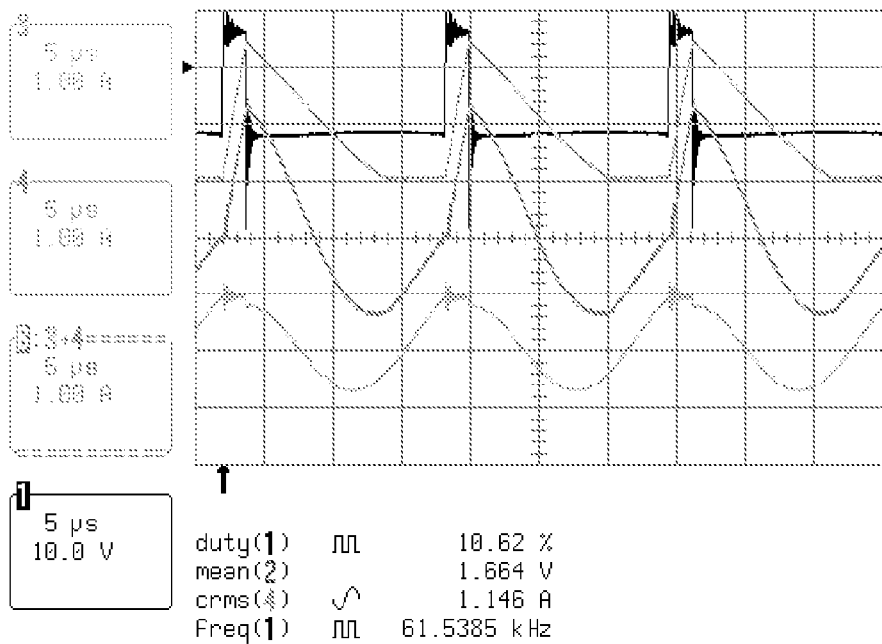
Figure 23A:
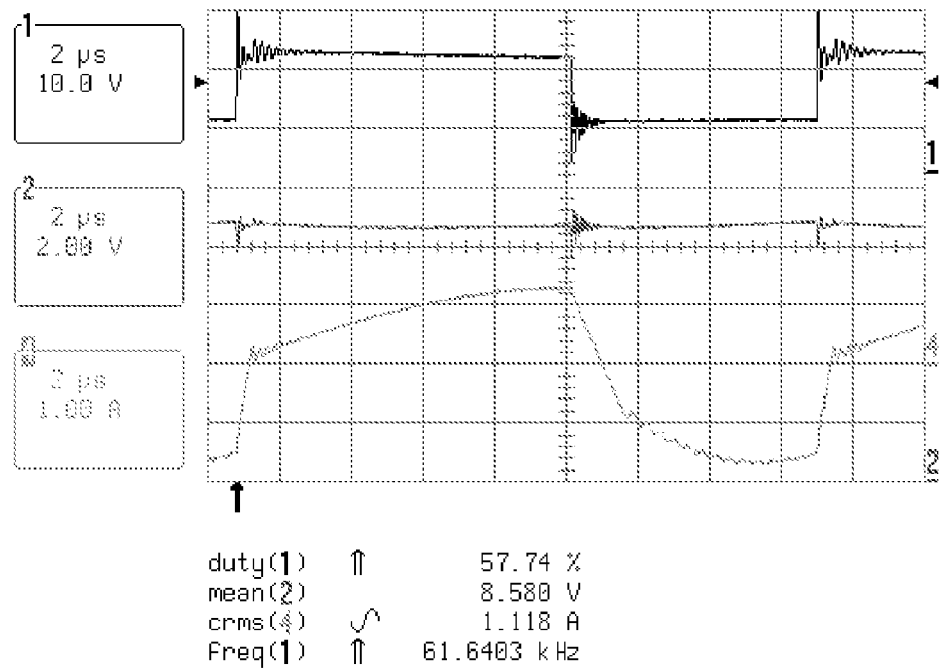
FIG. 23a and FIG. 23b are experimental demonstration of the output DC voltage control with duty ratio change only and constant switching frequency.
Figure 23B:
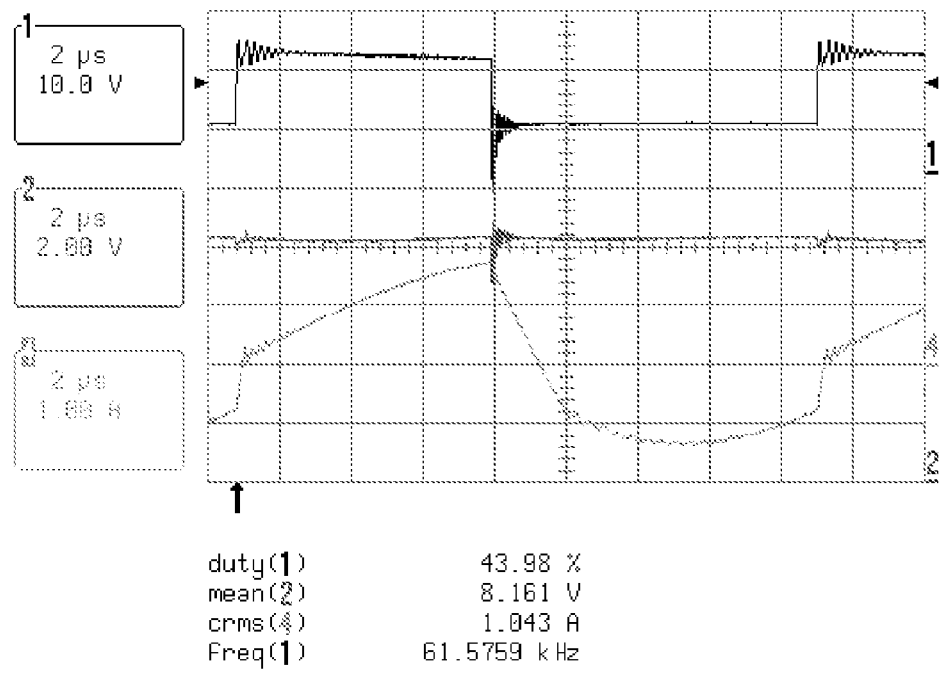
Figure 24A:
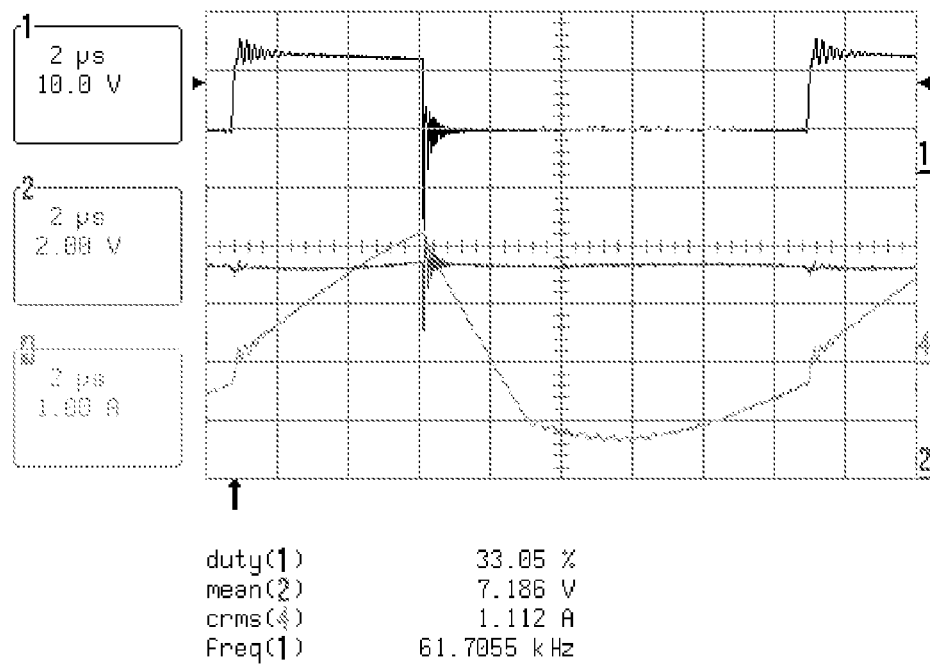
FIG. 24a and FIG. 24b are experimental demonstration of the output DC voltage control with duty ratio change only and constant switching frequency.
Figure 24B:
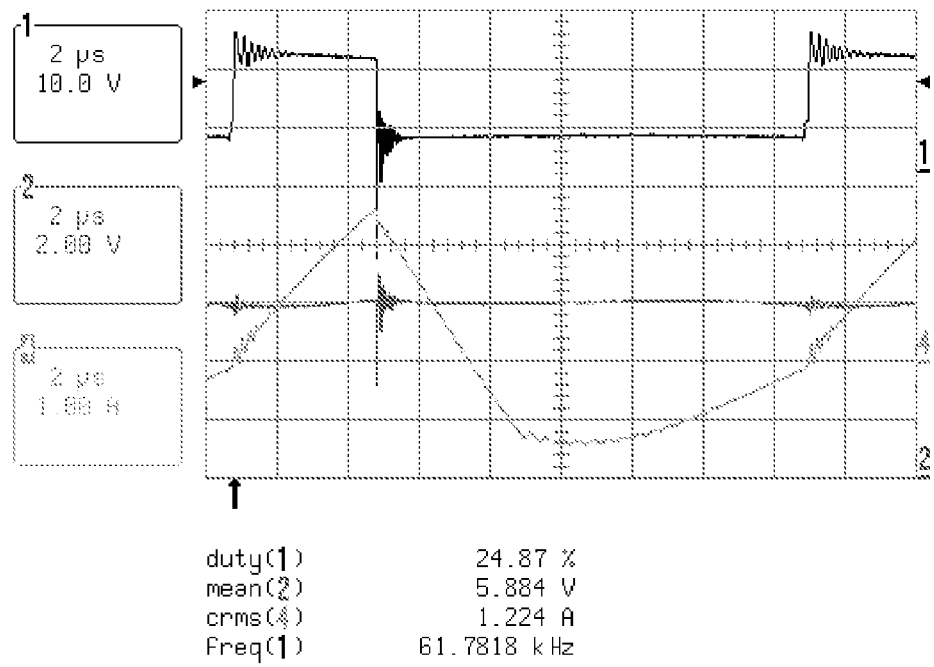
Figure 25A:
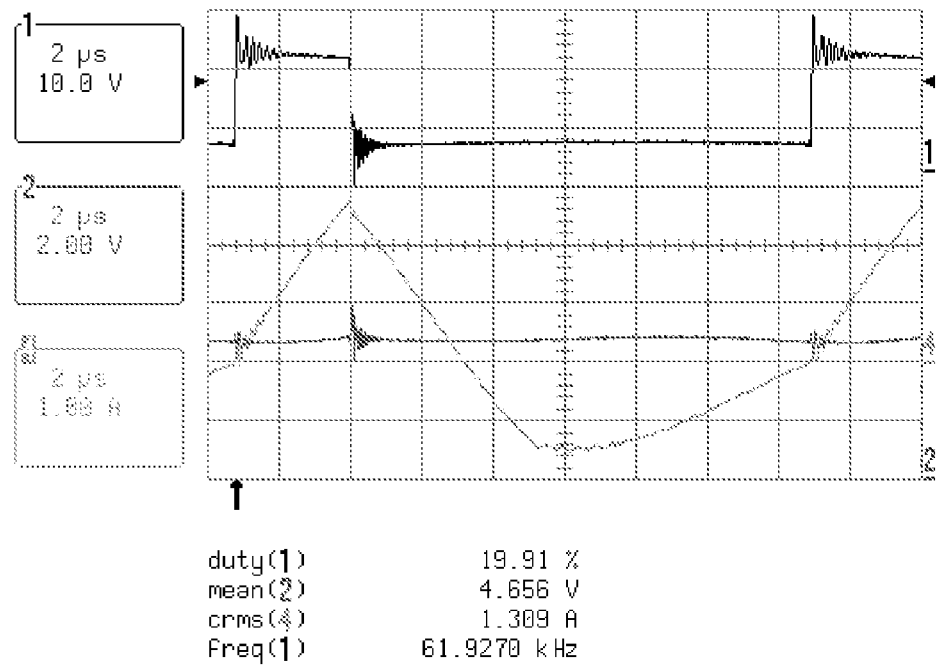
FIG. 25a and FIG. 25b are experimental demonstration of the output DC voltage control with duty ratio change only and constant switching frequency.
Figure 25B:
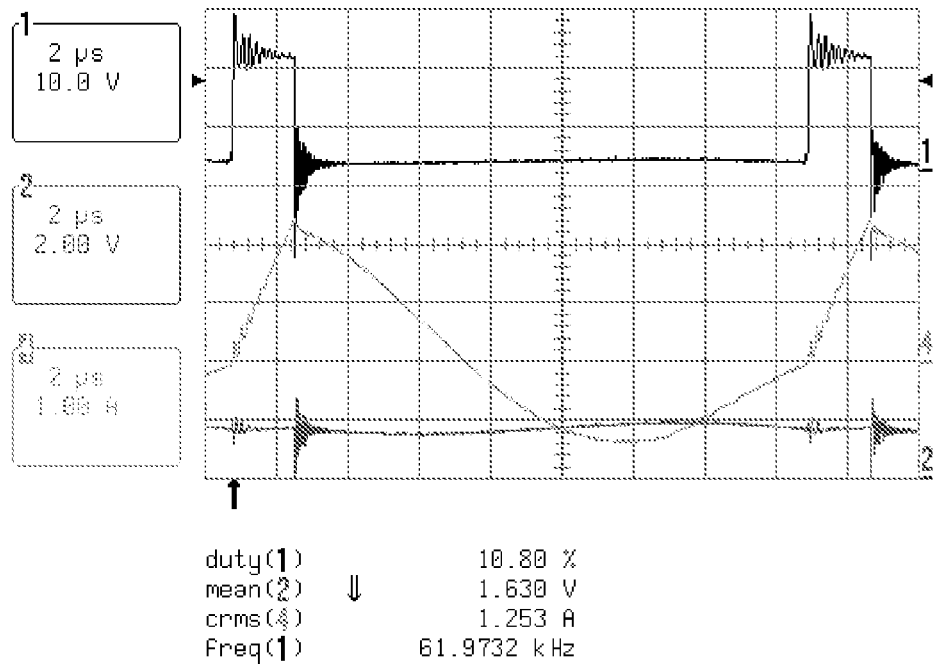

FIG. 22a and FIG. 22b, show also how further reduction of both duty ratio and simultaneous increase of switching frequency result in dramatic reduction of output voltage to 7.37V (at 0.65 duty ratio and 53.87 kHz) and to 1.66V at duty ratio of 0.9 and switching frequency of 61 kHz. Thus a very wide range of the change of the DC voltage is obtained from 9.38V to 1.66V while an almost constant rms current of the resonant capacitor of 1.1 A to 1.3 A is observed for DC load current of 1.0 A.

Control with Duty Ratio Only and with Constant Switching Frequency

In previous control the switching frequency was changed from 28 kHz to 61 kHz (2 to 1 frequency change) to obtain a control of DC output voltage over the wide input voltage range. Despite the limited change of frequency, in some applications this might be considered undesirable. Thus, an alternative method is introduced here which is based on standard control method operating at constant switching frequency and providing duty ratio control only.

The same experimental 20V to 10V converter is utilized, but the operating frequency is set at fixed switching frequency of 61 kHz and duty ratio is varied from 0.42 to 0.91 with respective current waveforms illustrated in FIGS. 23a-b, FIGS. 24a-b, and FIGS. 25a-b. Note that in the figures the complementary duty ratio D' is displayed, since the first interval shown is OFF-time interval D'$T_S$. In these figures, the top trace is the switch S voltage, the second trace is the output DC voltage and third trace is the resonant capacitor current. Note once again the very wide change of the output DC voltage from 8.8 V to 1.63V while the rms current of the resonant capacitor changed from the lowest of only 1.04 A (for an 1.0 A DC load current!) to a high of 1.25 A for a 1.63V output DC voltage. Therefore the ultrahigh efficiency will be maintained over the wide input voltage range.

Figure 26:
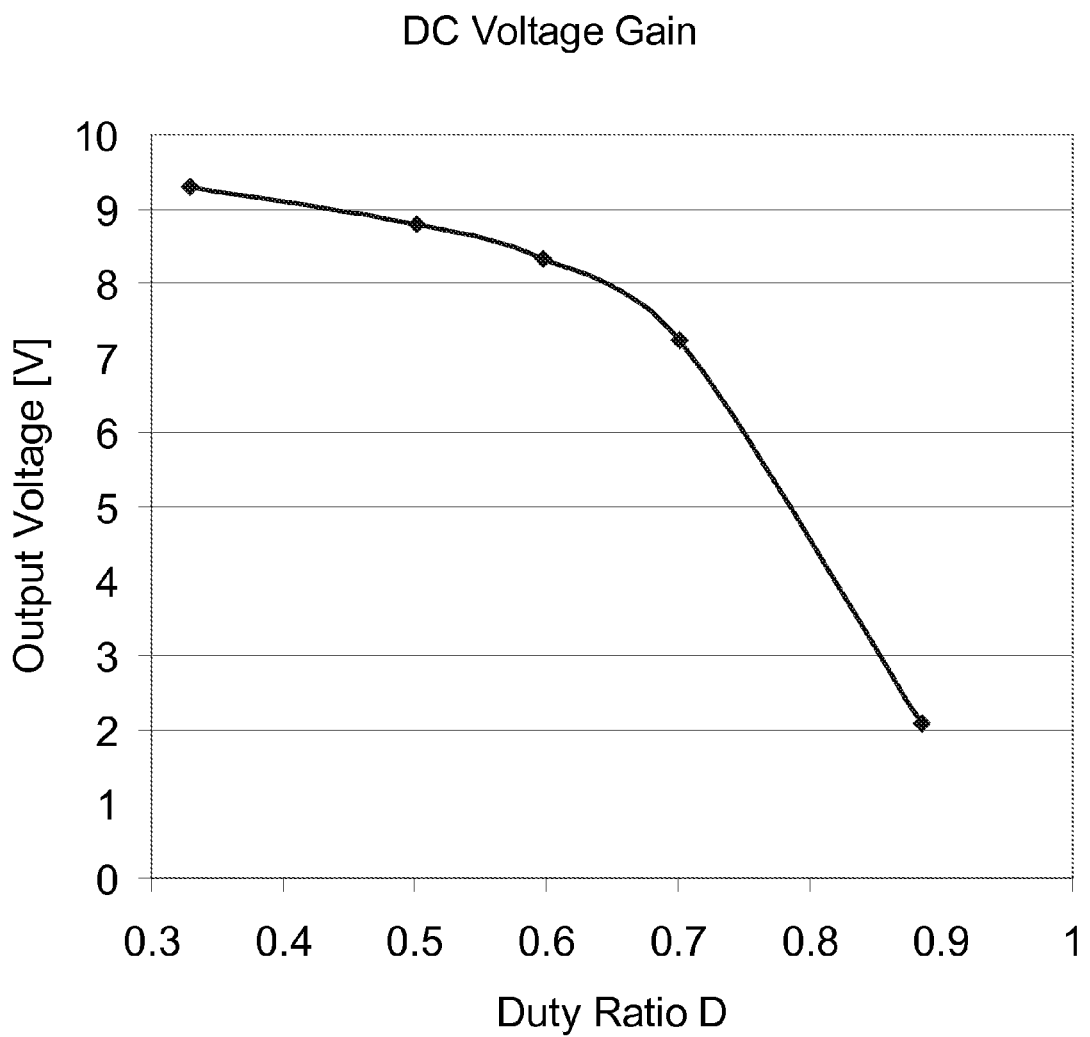
FIG. 26 illustrates the DC voltage change under the combined duty ratio and switching frequency control.
Figure 27:
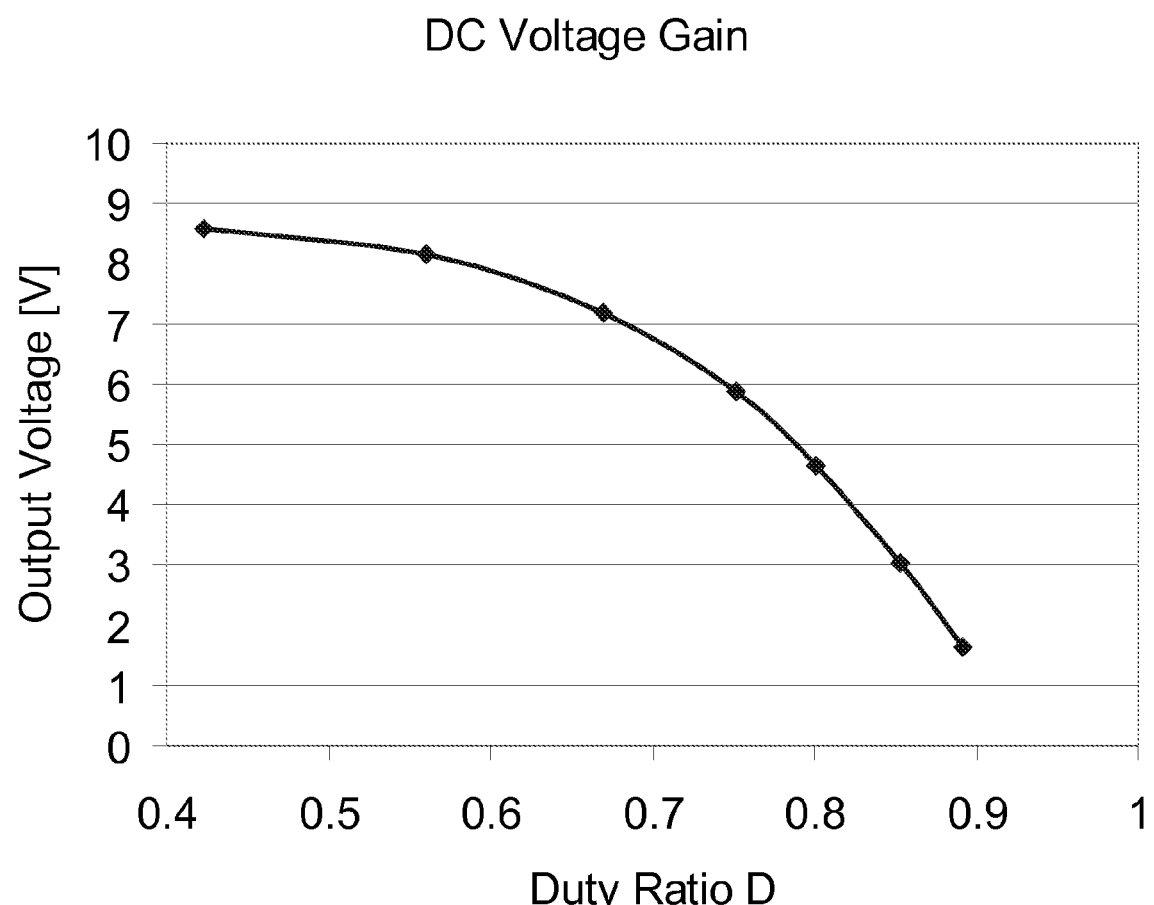
FIG. 27 illustrates output DC voltage change with only duty ratio control and constant switching frequency.

The graph of the DC voltage gain under duty ratio and switching frequency control is shown in FIG. 26. The graph of the DC voltage gain with duty ratio control only (and constant switching frequency!) is shown in FIG. 27.

Storageless Feature Under the Output DC Voltage Control

One of the unique advantage of the present invention described earlier is that under fixed duty ratio step-down it does not have any DC energy storage and is therefore capable of fast transient for large DC step-load current change. One might be now worried that this feature is lost under the two DC voltage control methods described above. This is, however, not the case, since the resonant capacitor current always returns to zero current level at three instances (beginning of the cycle, at the end of first ON-time interval and at the end of the switching period. Hence, the previously described immediate increase of the resonant current in response to the load current is available for the wide range of input voltage change and output voltage regulation.

Voltage Stresses of the Switches

Another important performance characteristic is the voltage stress imposed on the switches and in particular their variation with the operating point, the duty ratio D. In conventional DC-DC converters, the wide input DC voltage range is directly connected with the requirement for high voltage blocking rating of the switches. In fact, for a 2:1 step-down conversion and when operated at 50% duty ratio the two active switches are exposed only to 50% of the input DC voltage. Thus, for example, for 48V input voltage and 24V output voltage (nominal 2:1 step-down conversion) all four switches see 24V maximum voltage, so that even 30V rated switches with low ON resistance could be used. This is a feature not attained in any other conventional converter. Since the voltage stresses are independent of the operating point the wide input voltage range (6:1 and higher) can be accomplished with the preferable lower voltage and lower cost switches.

The two current rectifier switches on the other hand, have the voltage stresses equal to output DC voltage under all operating conditions, which once again is performance feature not achievable in any conventional converters.

Coupled-Inductor Extension of the Storageless Converter

Figure 28A:
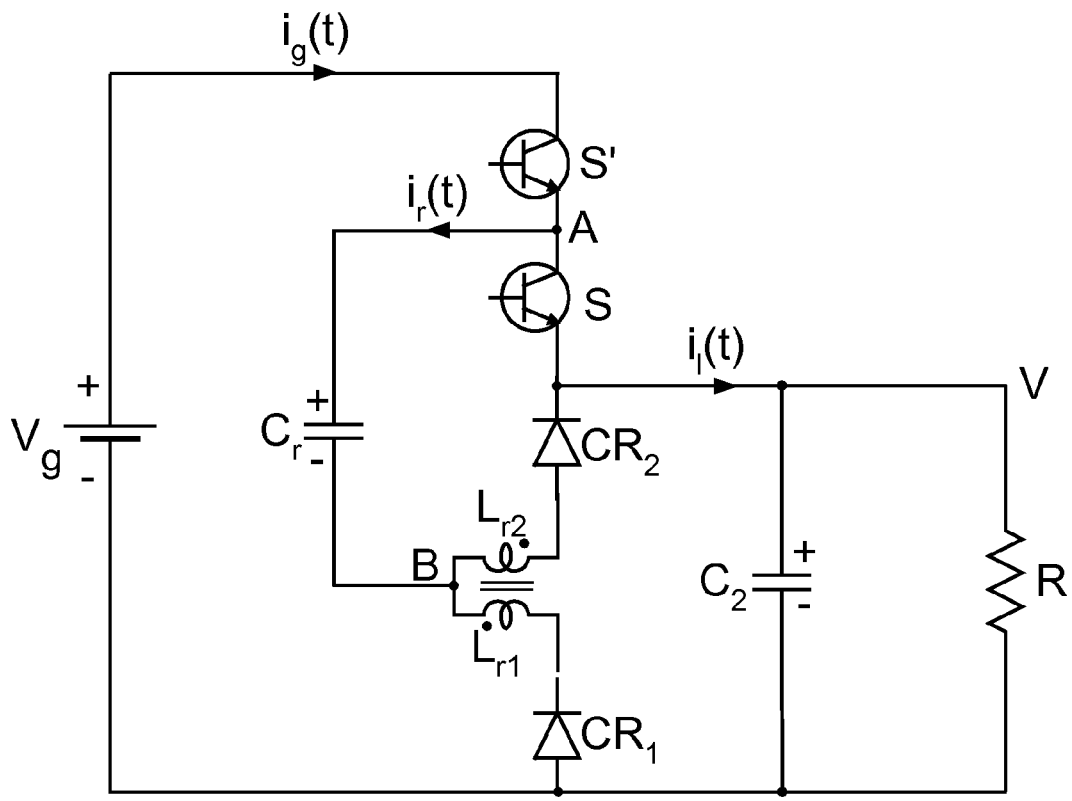
FIG. 28a illustrates the coupled-inductor extension.
Figure 28B:
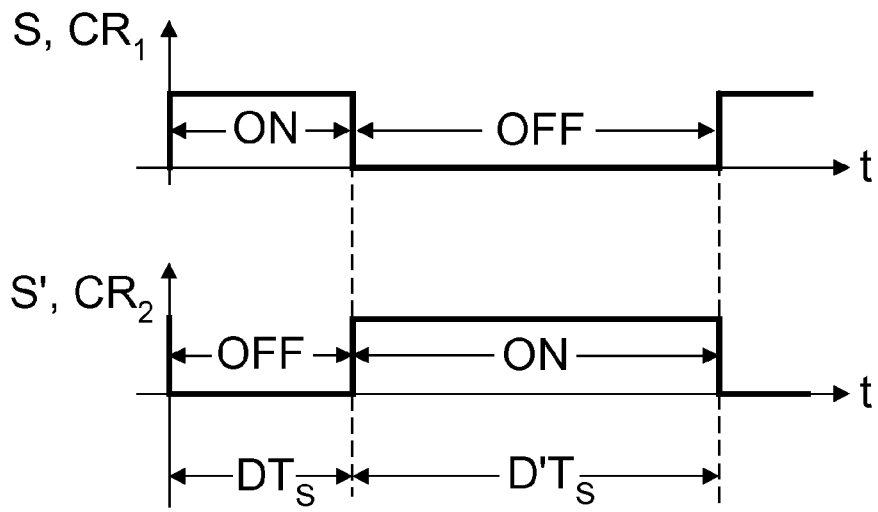
FIG. 28b shows respective state of switches.

The two resonant inductors can be combined into a single coupled-inductor structure shown in FIG. 28a in the case when two resonant inductors are operating completely separately with no overlap in their operation. The state of the switches is shown in FIG. 28b.

Single Resonant Inductor Extension of the Storageless Converter

Figure 29A:
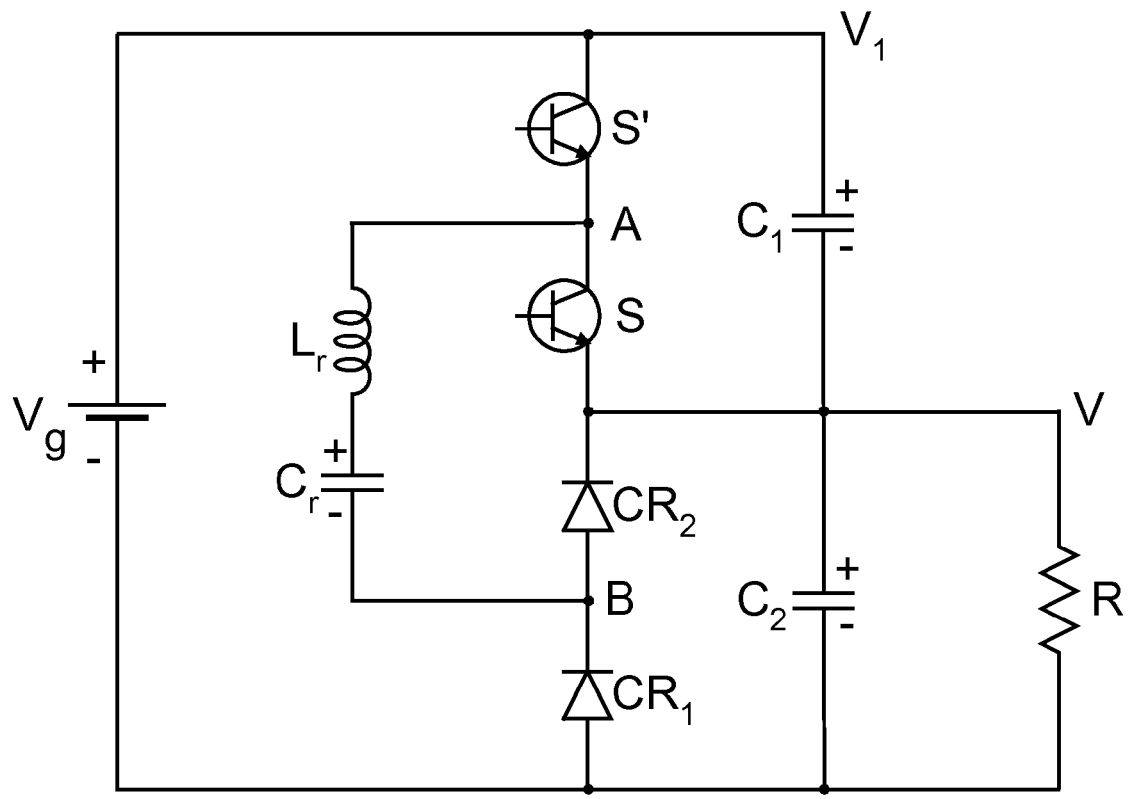
FIG. 29a illustrates the embodiment of a storageless converter with a single resonant inductor and FIG. 29b illustrates the respective state of the switches.

Instead of placing the two resonant inductors in current rectifier branches, a single resonant inductor can be placed in the resonant capacitor branch in series with the resonant capacitor to result in Single resonant inductor extension of storageless converter illustrated in FIG. 29a. The advantage of this extension is obviously that instead of two resonant inductors with two cores and two windings, a single magnetic core and a single winding can be used. The disadvantage is that the ability to have two distinct and separately adjustable resonant intervals is lost. Nevertheless, as we show here, the appropriate choice of the control can be used to overcome this initial disadvantage.

Control with Variable Switching Frequency and Constant 50% Duty Ratio

Figure 29B:
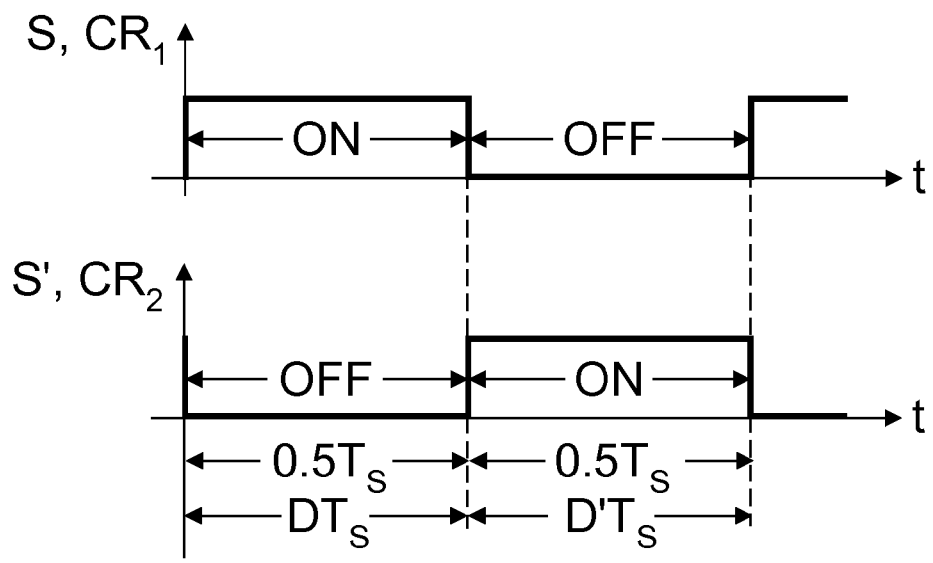
Figure 30A:
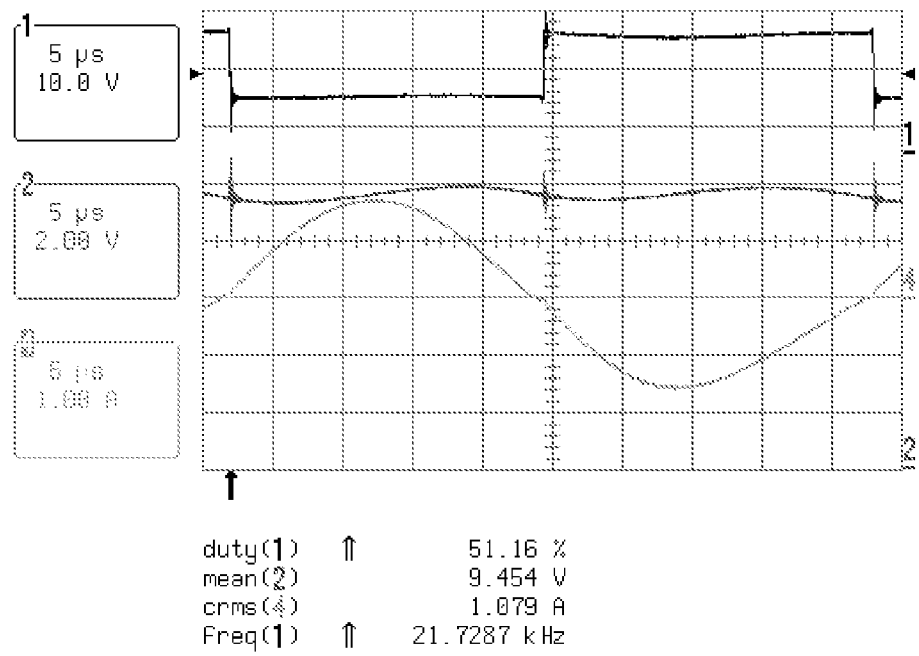
FIG. 30a and FIG. 30b illustrate the control of output DC voltage with a variable switching frequency but a fixed duty ratio of 0.5.
Figure 30B:
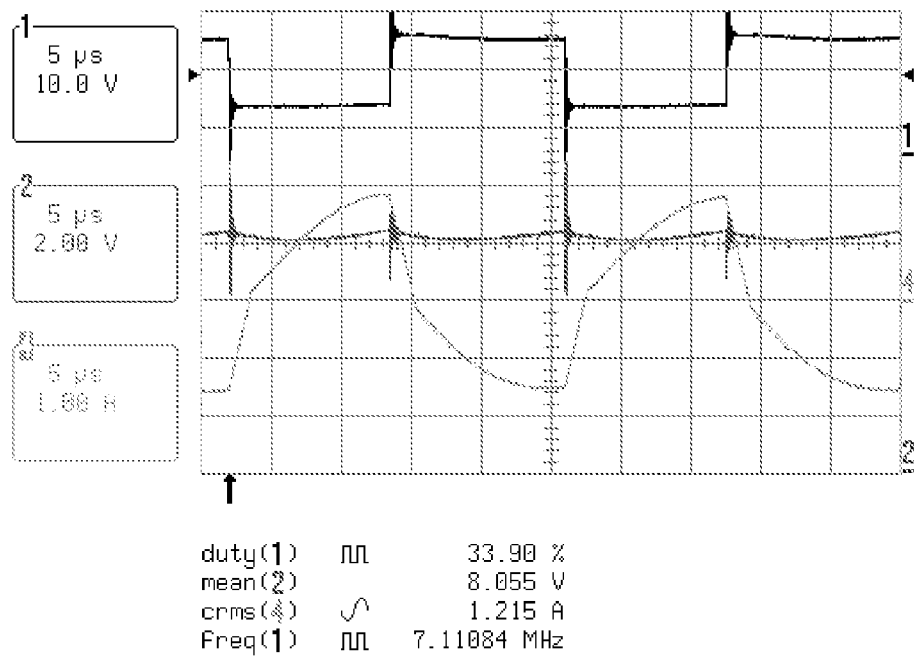
Figure 31:
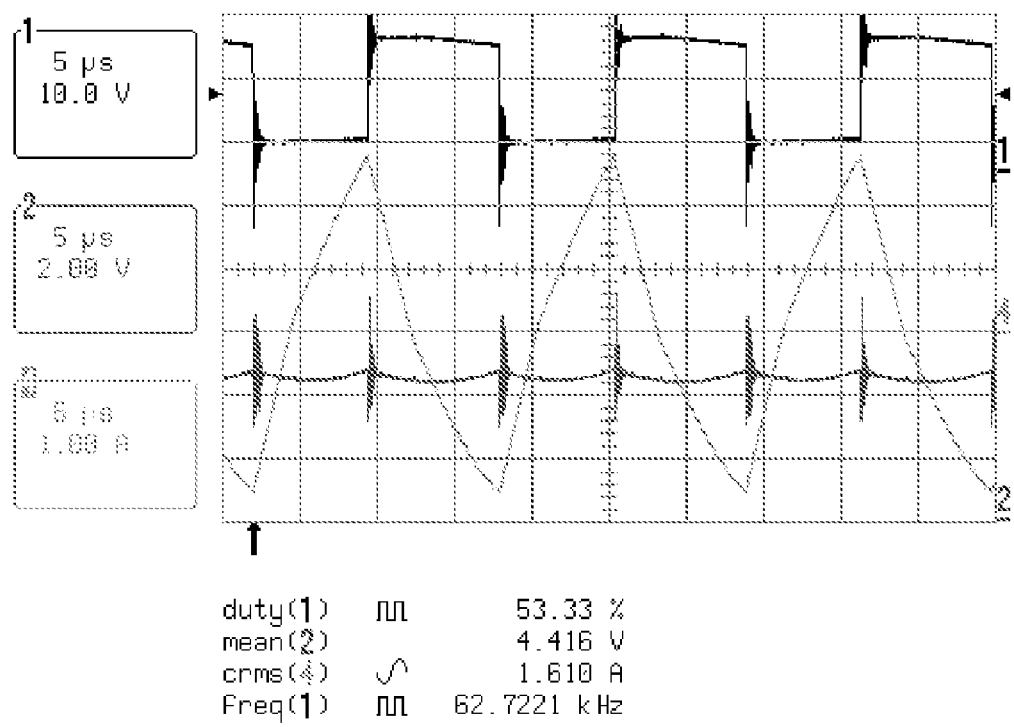
FIG. 31 illustrates the control of output DC voltage with a variable switching frequency but a fixed duty ratio of 0.5.
Figure 32A:
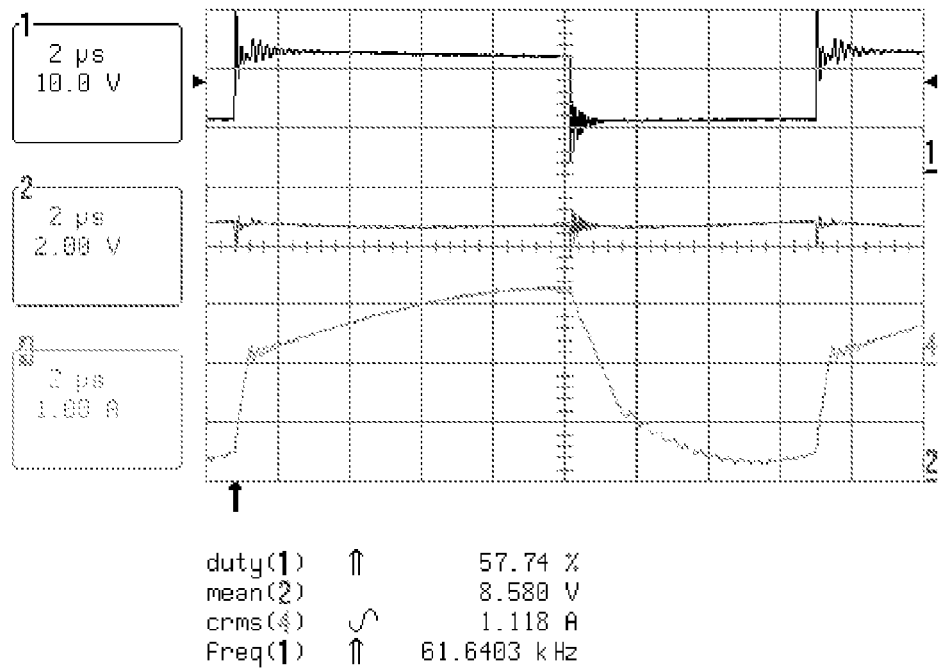
FIG. 32a illustrates the output DC voltage and the resonant capacitor current at 0.57 duty ratio
Figure 32B:
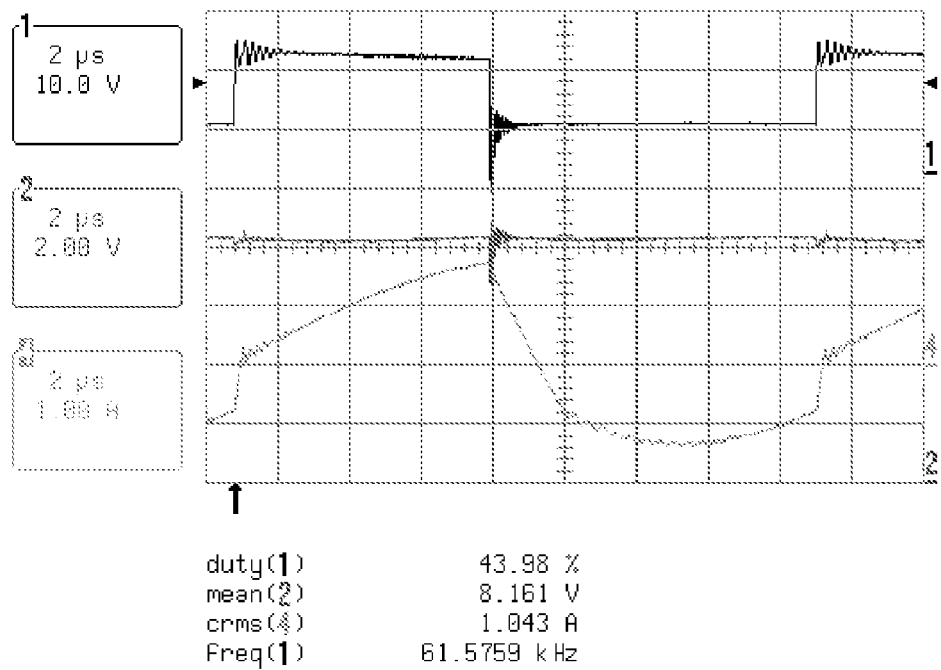
FIG. 32b illustrates the output DC voltage and resonant capacitor current at 0.44 duty ratio and respective switching frequencies.

Shown in FIG. 29b is such a control, where for nominal operation, the converter is operating with a fixed 50% duty ratio of the two active switches and the switching frequency is equal to the resonant frequency formed by resonant capacitor $C_r$ and resonant inductor $L_r$. Shown in FIG. 30a is such a case, where top trace is the main switch S voltage, middle trace is output DC voltage and bottom trace is the resonant capacitor and resonant inductor current (they are the same), showing the full sine-wave resonant current. The operation at approximately 50% duty ratio and 21 kHz switching frequency is shown to result in output DC voltage of 9.45V. As the switching frequency is increased to 45 kHz in FIG. 30b the DC voltage is reduced to 8V. Finally, the switching frequency increase to 62 kHz results in 4.4V output DC voltage (FIG. 31). Note that the rms value of the resonant current is changing from 1.08 A to 1.6 A for a 1.0 A load current. FIG. 31 shows the experimental waveforms when the output voltage is further reduced to 4.42V. FIG. 32a and FIG. 32b show the output DC voltage with superimposed AC ripple voltage for two different operating conditions.

Synchronous Rectifier Extension

Figure 33A:
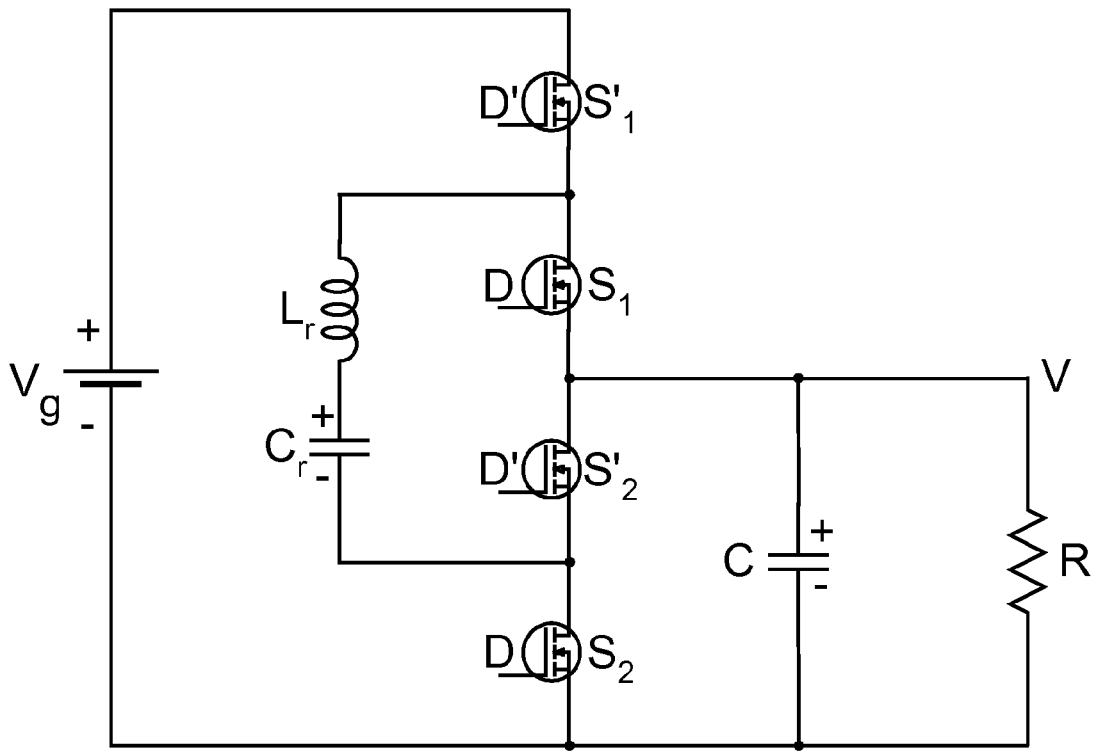
FIG. 33a illustrates the embodiment of storageless converter in which current rectifiers are replaced with MOSFET transistors operated as synchronous rectifiers.
Figure 33B:
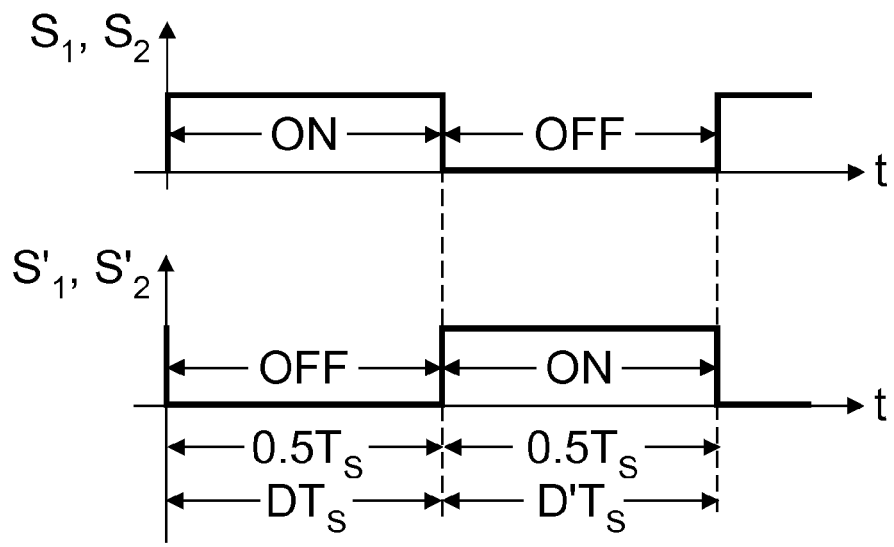
FIG. 33b represents respective states of all switches.
Figure 34:
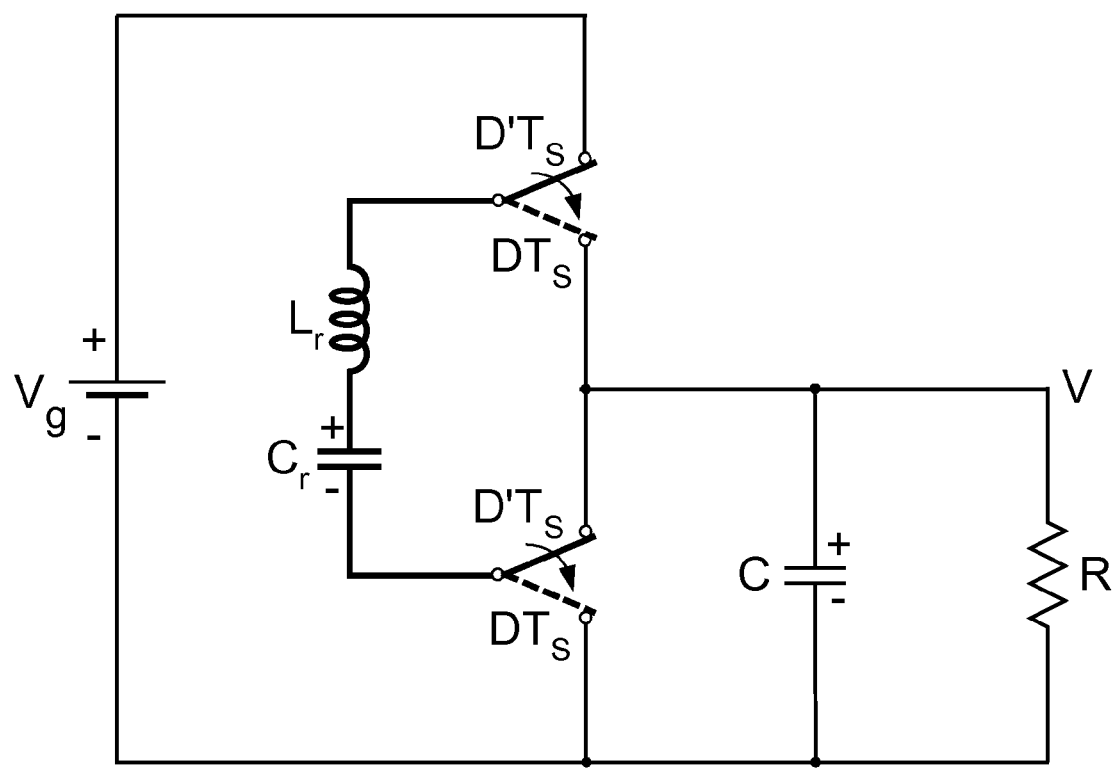
FIG. 34 shows the operation of four MOSFET switches with two ideal double-pole, double through switches.
Figure 35A:
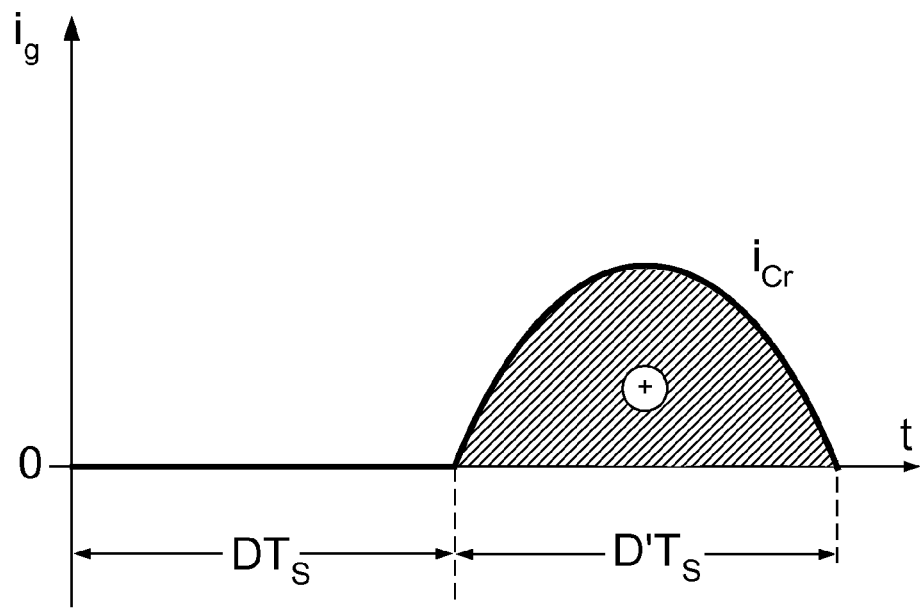
Figure 35B:
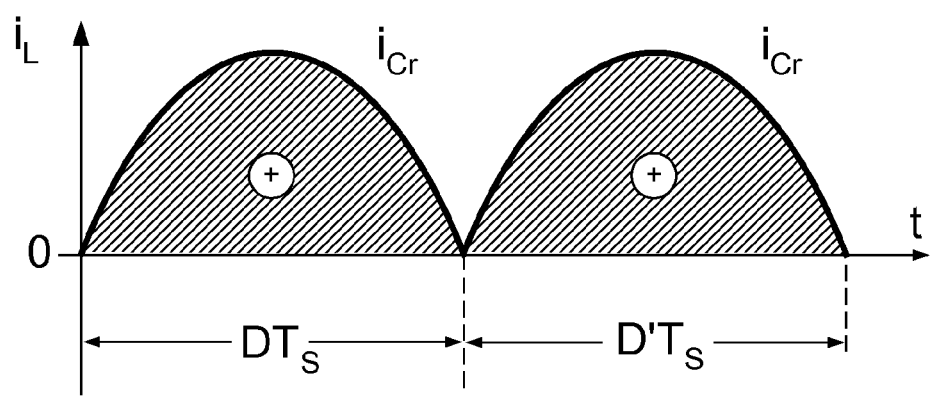

In order to maximize the efficiency, the current rectifiers are replaced by MOSFET transistors operating as synchronous rectifiers as illustrated in FIG. 33a and FIG. 33b to reduce the body-diode conduction losses. In this particular case there was no attempt to control MOSFET synchronous rectifiers so that they would just bypass the diode conduction when needed. Thus, the four MOSFET switches are providing an effective switching action as illustrated by the double-pole double-through ideal switches as shown in FIG. 34. Therefore, the converter operation is limited to the fixed 2-1 step-down conversion ratio. The respective input and output current waveforms are shown in FIG. 35a and FIG. 35b.

Bi-Directional Converter Operation

An all MOSFET implementation of FIG. 33a, has an automatic and built-in advantage as it can operate as a bi-directional converter, stepping down DC voltage in one direction, and stepping-UP DC voltage in opposite direction. This is clearly made possible due to the fact that MOSFET switches are current bi-directional device allowing current flow in either direction. Similarly, the resonant capacitors are non-polarized type, usually implemented with ceramic chip capacitors with high ripple current ratings.

The same converter could be therefore used to boost the DC voltage by a 1:2 step-up ratio, if the DC voltage source and load were to exchange their places in converter on FIG. 33a.

Efficiency and Size of a Prototype

Figure 36A:
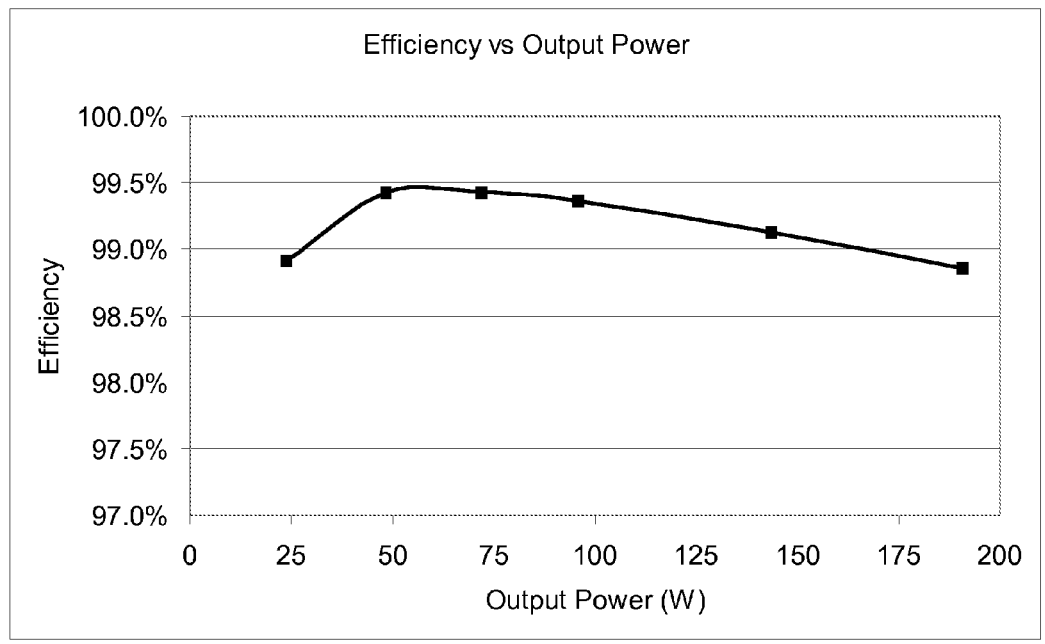
FIG. 36a illustrates the efficiency measurement on a 200 W experimental converter and FIG. 36b illustrates the total power loss of the 200 W converter.
Figure 36B:
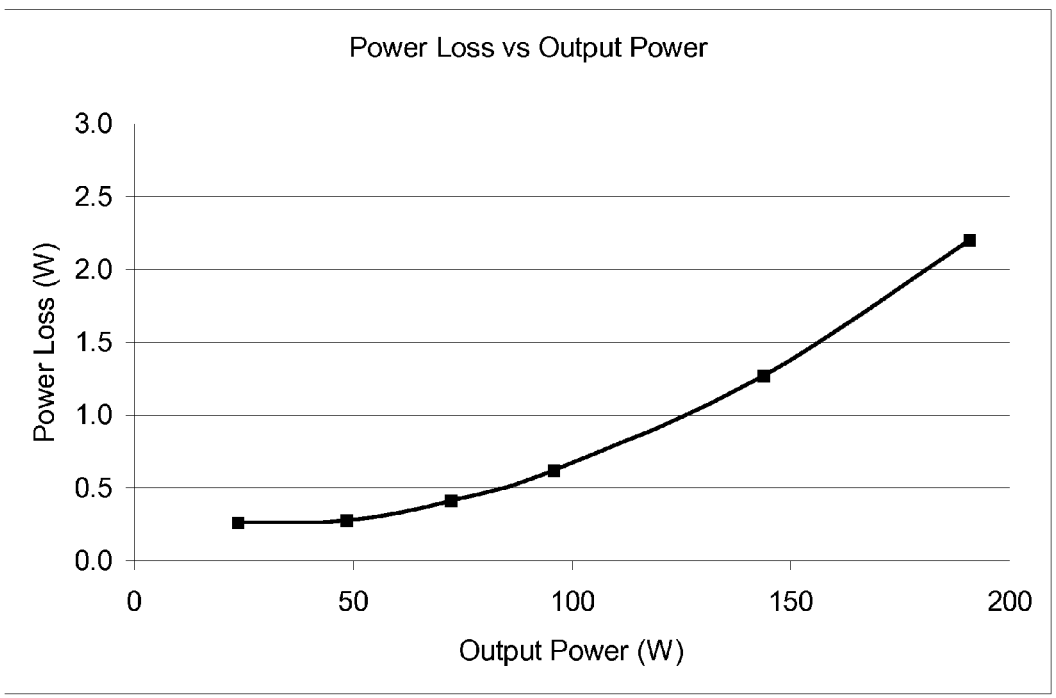

To demonstrate ultra high efficiency and ultra small size of the storageless converter a prototype DC-DC converter is built based on the synchronous rectifier extension of FIG. 33a and with following specifications and component values:

Specifications: 200 W, 48V to 24V converter.
Power stage size: 52 mm×17 mm×4 mm
Components:
MOSFETS: four μPA270
Input and output capacitors: 80 μF each.
Resonant capacitor: 60 μF
Resonant inductor: 430 nH
Resonant and switching frequency: 50 kHz Graph of the efficiency and power loss as a function of the output power is shown in FIG. 36a and FIG. 36b respectively. Note that the maximum efficiency of 99.5% is achieved at around 75 W power level while the very high efficiency of over 99% is obtained over the wide load range from 25 W to 175 W power range. This confirms that the main losses are of the conductive nature.

Power loss curve also shows that the total dissipation is less then 1.5 W at the power level of 160 W. Thus, it is not surprising that despite the ultra small size of the power stage of the converter measuring 52 mm×17 mm×4 mm, the low temperature rise is observed even without any forced air and any heat-sink.

Figure 37:
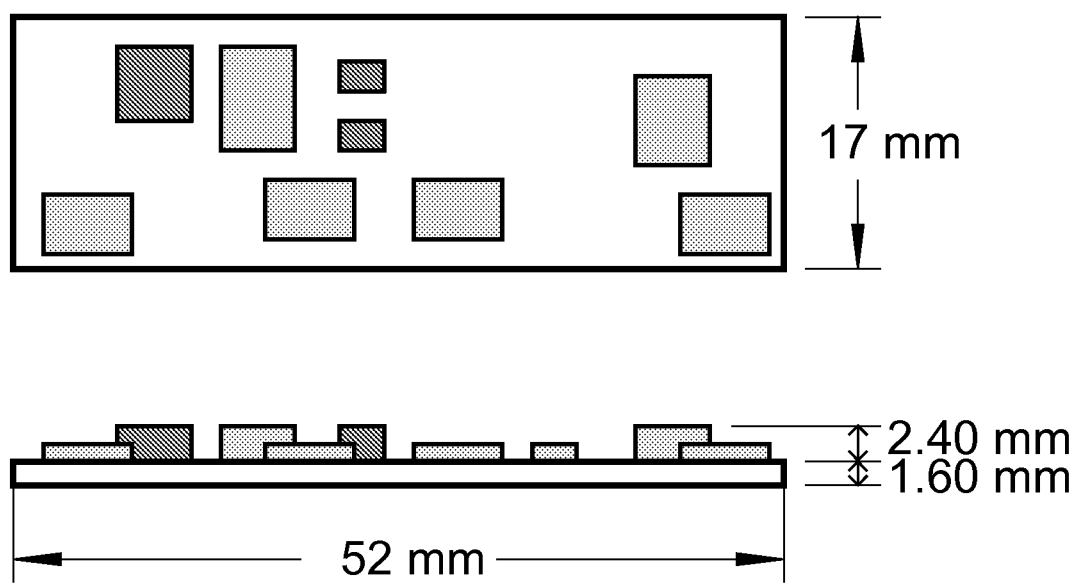
FIG. 37 illustrates the mechanical dimensions of the power stage of the 200 W converter prototype.

The size of the converter is illustrated in mechanical drawing of FIG. 37.

CONCLUSION

A storageless step-down DC-DC converter is provided which achieves simultaneously highest efficiency of 99.5% in an ultra compact size, leading to 1 kW per cubic inch power density.

REFERENCES

1. Slobodan Cuk, "*Modeling, Analysis and Design of Switching Converters*", PhD thesis, November 1976, California Institute of Technology, Pasadena, Calif., USA.
2. Dragan Maksimovic, "*Synthesis of PWM and Quasi-Resonant DC-to-DC Power Converters*", PhD thesis, Jan. 12, 1989, California Institute of Technology, Pasadena, Calif., USA;

3. Vatche Vorperian, "*Resonant Converters*", PhD thesis, California Institute of technology, Pasadena, Calif.;
4. Slobodan Cuk, R. D. Middlebrook, "*Advances in Switched-Mode Power Conversion*", Vol. 1, II, and III, TESLAco 1981 and 1983.

What is claimed is:

1. A switching DC-to-DC converter for providing power from a DC voltage source connected between an input terminal and a common terminal to a DC load connected between an output terminal and said common terminal, said converter comprising:
   a first controllable three-terminal switch with one end connected to said output terminal;
   a second controllable three-terminal switch with one end connected to another end of said first switch and the other end connected to said input terminal;
   a first (two-terminal) current rectifier (diode) switch with anode end connected to said common terminal;
   a first resonant inductor with one end connected to the cathode end of the first rectifier switch;
   a second resonant inductor with one end connected to another end of said first resonant inductor;
   a second current rectifier switch with anode end connected to another end of said second resonant inductor and a cathode end connected to said output terminal;
   a resonant capacitor with one end connected to said another end of said first resonant inductor and another end connected to said another end of said first controllable three-terminal switch;
   switching means for keeping said first controllable three-terminal switch ON and second controllable three-terminal switch OFF during ON-time interval $T_{ON}$ and said first controllable three-terminal switch OFF and second three-terminal controllable switch ON during the OFF-time interval $T_{OFF}$, where $T_{ON}$ and $T_{OFF}$ are complementary time intervals within one switching operating cycle $T_S$ and where controllable duty ratio D of said first controllable three-terminal switch is defined as the ratio $T_{ON}/T_S$;
   wherein said first resonant inductor and said resonant capacitor form a first resonant circuit with a half of a first resonant period $T_{RI}$ equal to said $T_{ON}$ time interval;
   wherein said second resonant inductor and said resonant capacitor form a second resonant circuit with a half of a second resonant period $T_{R2}$ equal to said $T_{OFF}$ time interval;
   wherein a fixed 2 to 1 step-down voltage conversion ratio is obtained;
   whereby said first resonant inductor is fully flux balanced during the ON-time interval and excited by said resonant capacitor ac ripple voltage resulting in much reduced flux excitation and an order of magnitude smaller inductor than inductors in PWM converters;
   whereby said second resonant inductor is fully flux balanced during the OFF-time interval and excited by said resonant capacitor ac ripple voltage resulting in much reduced flux excitation and an order of magnitude smaller inductor than inductors in PWM converters;
   wherein controlling ON-time $T_{ON}$ of said first three-terminal controllable switch continuously to be shorter than said half of the first resonant period $T_{RI}$ will result in additional continuous output voltage control bellow 2 to 1 initial voltage step-down;
   whereby the continuous output voltage control is achieved by modulation of the conduction time $T_{FW1}$ of the first current rectifier switch;
   whereby the first current rectifier conduction time interval $T_{FW1}$ is defined as the time this rectifier continues to conduct after the first three-terminal controllable switch is turned-OFF within single switching cycle $T_S$;
   wherein, alternatively, controlling OFF- time of the second three-terminal controllable switch $T_{OFF}$ continuously to be shorter than said half of the second resonant period $T_{R2}$ will result in additional continuous output voltage control bellow 2 to 1 initial voltage step-down;
   whereby the continuous output voltage control is achieved by modulation of the conduction time of the second current rectifier switch $T_{FW2}$;
   whereby the second current rectifier conduction time interval $T_{FW2}$ is defined as the time the second current rectifier continues to conduct after the second three terminal controllable switch is turned-OFF within single switching cycle $T_S$;
   whereby the regulation of the output voltage is achieved using Pulse Width Modulated (PWM) duty ratio control despite the input voltage change and load current change from full load to no load;
   whereby small ac flux excursions of said first and said second resonant inductors and are maintained not only in the fixed 2 to 1 voltage step-down conversion but under the continuous output voltage control via duty ratio control.

2. A converter as defined in claim 1, wherein said first controllable three-terminal switch and said second controllable threeterminal switch are semiconductor MOSFET transistors, and whereby said first switch and said second switch have substantially reduced conduction losses.

3. A converter as defined in claim 1, wherein said first rectifier switch is a semiconductor MOSFET transistor, wherein said switching means keep said MOSFET transistor ON during said $T_{ON}$ time interval and OFF during said $T_{OFF}$ time interval, and whereby said MOSFET transistor has substantially reduced conduction losses.

4. A converter as defined in claim 3, wherein said second rectifier switch is a semiconductor MOSFET transistor, wherein said switching means keep said MOSFET transistor ON during time when the body diode of said MOSFET switch conducts; whereby said MOSFET transistor has substantially reduced conduction losses, and whereby controlling ON time of said first controllable three-terminal switch to be shorter than said $T_{ON}$ time interval provides a continuous output voltage control bellow fixed 2 to 1 step-down voltage ratio.

5. A converter as defined in claim 1, wherein a winding of said first resonant inductor and a winding of said second resonant inductor are placed on a common magnetic core to form a coupled-inductors structure, and whereby total size and power losses of both said first and said second resonant inductors are substantially reduced.

6. A converter as defined in claim 1, wherein the continuous output voltage control is achieved by operating at the constant duty ratio at which the fixed 2 to 1 step-down conversion ratio is obtained and then continuously varying the switching frequency.

7. A converter as defined in claim 4,
wherein said switching means are adjusted to provide the bi-directional current flow and fixed 2:1 voltage step-down in one direction and fixed 2:1 voltage step-up in the other direction.

8. A switching DC-to-DC converter for providing power from a DC voltage source connected between an input terminal and a common terminal to a DC load connected between an output terminal and said common terminal, said converter comprising:
a first controllable three-terminal switch with one end connected to said output terminal;
a second controllable three-terminal switch with one end connected to another end of said first switch and another end connected to said input terminal;
a first current rectifier switch with anode end connected to said common terminal;
a second current rectifier switch with a cathode end connected to said output terminal and an anode end connected to a cathode end of said first current rectifier;
a resonant capacitor with one end connected to said cathode end of first rectifier switch;
a resonant inductor connected with one end to another end of said resonant capacitor and another end connected to said another end of first controllable three-terminal switch
switching means for keeping said first controllable three-terminal switch ON and second controllable three-terminal switch OFF during ON-time interval $T_{ON}$ and said first controllable three-terminal switch OFF and second three-terminal controllable switch ON during the OFF-time interval $T_{OFF}$, where $T_{ON}$ and $T_{OFF}$ are equal and complementary time intervals within one switching operating cycle $T_s$ and where controllable duty ratio D of said first controllable three-terminal switch is defined as the ratio $T_{ON}/T_S$;
wherein said resonant inductor and said resonant capacitor form a first resonant circuit with a half of a first resonant period $T_{R1}$ equal to said $T_{ON}$ time interval;
wherein said second resonant inductor and said resonant capacitor form a second resonant circuit with a half of a second resonant period $T_{R2}$ equal to said $T_{OFF}$ time interval;
wherein a fixed 2 to 1 step-down voltage conversion ratio is obtained;
whereby said resonant inductor is fully flux balanced during the ON-time interval and excited by said resonant capacitor ac ripple voltage resulting in much reduced flux excitation and an order of magnitude smaller inductor than inductors in PWM converters;
whereby said resonant inductor is fully flux balanced during the OFF- time interval and excited by said resonant capacitor ac ripple voltage resulting in much reduced flux excitation and an order of magnitude smaller inductor than inductors in PWM converters;
wherein controlling ON-time $T_{ON}$ of said first three-terminal controllable switch continuously to be shorter than said half of the first resonant period $T_{R1}$ will result in additional continuous output voltage control bellow 2 to 1 initial voltage step-down;
whereby the continuous output voltage control is achieved by modulation of the conduction time $T_{FW1}$ of the first current rectifier switch;
whereby the first current rectifier conduction time interval $T_{FW1}$ is defined as the time this rectifier continues to conduct after the first three-terminal controllable switch is turned-OFF within single switching cycle $T_S$;
wherein, alternatively, controlling OFF- time of the second three-terminal controllable switch $T_{OFF}$ continuously to be shorter than said half of the second resonant period $T_{R2}$ will result in additional continuous output voltage control bellow 2 to 1 initial voltage step-down;
whereby the continuous output voltage control is achieved by modulation of the conduction time of the second current rectifier switch $T_{FW2}$;
whereby the second current rectifier conduction time interval $T_{FW2}$ is defined as the time the second current rectifier continues to conduct after the second three-terminal controllable switch is turned-OFF within single switching cycle $T_S$;
whereby the regulation of the output voltage is achieved using Pulse Width Modulated (PWM) duty ratio control despite the input voltage change and load current change from full load to no load;
whereby small ac flux excursions of resonant inductors are maintained not only in the fixed 2 to 1 voltage step-down conversion but in the continuous output voltage control via duty ratio control.

9. A converter as defined in claim 8,
wherein said first three-terminal controllable switch and said second three-terminal controllable switch are semiconductor MOSFET transistors, and
whereby said first switch and said second switch have substantially reduced conduction losses.

10. A converter as defined in claim 8,
wherein said first rectifier switch is a semiconductor MOSFET transistor,
wherein said switching means keep said MOSFET transistor ON during said $T_{ON}$ time interval and OFF during said $T_{OFF}$ time interval, and
whereby said fourth switch has substantially reduced conduction losses.

11. A converter as defined in claim 8,
wherein said first rectifier switch is a semiconductor MOSFET transistor,
wherein said switching means keep said MOSFET transistor ON during the time when the body diode of said MOSFET switch conducts;
whereby said MOSFET transistor has substantially reduced conduction losses, and
whereby control of ON time of said MOSFET transistor shorter than said $T_{ON}$ time interval provides a continuous output DC voltage control bellow the fixed 2 to 1 step-down voltage conversion.

12. A converter as defined in claim 11,
wherein the continuous output voltage control is achieved by operating at the constant duty ratio at which the fixed 2 to 1 step-down conversion ratio is obtained and then continuously varying the switching frequency.

13. A converter as defined in claim 8, wherein said switching means are adjusted to provide the bi-directional current flow and fixed 2:1 voltage step-down in one direction and fixed 2:1 voltage step-up in the other direction.

14. A switching DC-to-DC converter for providing power from a DC voltage source connected between an input terminal and a common terminal to a DC load connected between an output terminal and said common terminal, said converter comprising:
a first resonant circuit comprising, the series connection of:
first three-terminal controllable switch, resonant capacitor, first resonant inductor, first rectifier and the load to provide a half-sinusoidal resonant current flow with a half of a first resonant period $T_{R1}$ equal to $T_{ON}$, the ON-time interval of the first three-terminal controllable switch;

a second resonant circuit comprising the series connection of: input voltage source, second three-terminal controllable switch, resonant capacitor, second resonant inductor, second rectifier and the load to provide a half-sinusoidal resonant current flow with a half of a second resonant period $T_{R2}$ equal to $T_{OFF}$, the OFF-time interval of the second three-terminal controllable switch;

switching means for keeping said first controllable three-terminal switch ON and second controllable three-terminal switch OFF during ON-time interval $T_{ON}$ and said first controllable three-terminal switch OFF and second three-terminal controllable switch ON during the OFF-time interval $T_{OFF}$, where $T_{ON}$ and $T_{OFF}$ are complementary time intervals within one switching operating cycle $T_S$ and where controllable duty ratio D of said first controllable three-terminal switch is defined as the ratio $T_{ON}/T_S$;

wherein a fixed 2 to 1 step-down voltage conversion ratio is obtained;

whereby said first resonant inductor is fully flux balanced during the ON-time interval and excited by said resonant capacitor ac ripple voltage resulting in much reduced flux excitation and an order of magnitude smaller inductor than inductors in PWM converters;

whereby said second resonant inductor is fully flux balanced during the OFF-time interval and excited by said resonant capacitor ac ripple voltage resulting in much reduced flux excitation and an order of magnitude smaller inductor than inductors in PWM converters;

wherein controlling ON-time $T_{ON}$ of said first three-terminal controllable switch continuously to be shorter than said half of the first resonant period $T_{R1}$ will result in additional continuous output voltage control bellow 2 to 1 initial voltage step-down;

whereby the continuous output voltage control is achieved by modulation of the conduction time $T_{FW1}$ of the first current rectifier switch;

whereby the first current rectifier conduction time interval $T_{FW1}$ is defined as the time this rectifier continues to conduct after the first three-terminal controllable switch is turned-OFF within single switching cycle $T_S$;

wherein, alternatively, controlling OFF- time of the second three-terminal controllable switch $T_{OFF}$ continuously to be shorter than said half of the second resonant period $T_{R2}$ will result in additional continuous output voltage control bellow 2 to 1 initial voltage step-down;

whereby the continuous output voltage control is achieved by modulation of the freewheeling conduction time of the second current rectifier switch $T_{FW2}$;

whereby the second current rectifier conduction time interval $T_{FW2}$ is defined as the time this rectifier continues to conduct after the second three-terminal controllable switch is turned-OFF within single switching cycle $T_S$;

whereby the regulation of the output voltage is achieved using Pulse Width Modulated (PWM) duty ratio control despite the input voltage change and/or load current change from full load to no load;

whereby small ac flux excursions of said first and said second resonant inductors and are maintained not only in the fixed 2 to 1 voltage step-down conversion but under the continuous output voltage control via duty ratio control.

15. A converter as defined in claim 14, wherein said first three-terminal controllable switch and said second three-terminal controllable switch are semiconductor MOSFET transistors, and whereby said first switch and said second switch have substantially reduced conduction losses.

16. A converter as defined in claim 14, wherein said first rectifier switch is a semiconductor MOSFET transistor, wherein said switching means keep said MOSFET transistor ON during said $T_{ON}$ time interval and OFF during said $T_{OFF}$ time interval, and whereby said fourth switch has substantially reduced conduction losses.

17. A converter as defined in claim 14, wherein said first rectifier switch is a semiconductor MOSFET transistor, wherein said switching means keep said MOSFET transistor ON during the time when the body diode of said MOSFET transistor conducts;

whereby said MOSFET transistor has substantially reduced conduction losses, and whereby control of ON time of said MOSFET transistor shorter than said $T_{ON}$ time interval provides a continuous output DC voltage control bellow the fixed 2 to 1 step-down voltage conversion.

18. A converter as defined in claim 14, wherein a winding of said first resonant inductor and a winding of said second resonant inductor are placed on a common magnetic core to form a coupled-inductors structure, and whereby total size and power losses of both said first and said second resonant inductors are substantially reduced.

19. A converter as defined in claim 14, wherein the continuous output voltage control is achieved by operating at the constant duty ratio at which the fixed 2 to 1 step-down conversion ratio is obtained and then continuously varying the switching frequency.

20. A converter as defined in claim 17, wherein said switching means are adjusted to provide the bi-directional current flow and fixed 2:1 voltage step-down in one direction and fixed 2:1 voltage step-up in the other direction.

* * * * *